US011060460B1

(12) United States Patent
Mcintyre, II et al.

(10) Patent No.: US 11,060,460 B1
(45) Date of Patent: Jul. 13, 2021

(54) FUEL DISTRIBUTION SYSTEM FOR GAS TURBINE ENGINE

(71) Applicant: Marine Turbine Technologies, LLC, Franklin, LA (US)

(72) Inventors: Ted Lee Mcintyre, II, New Iberia, LA (US); Nelson Joseph Geoffroy, Erath, LA (US); Marc G. Boulanger, Erath, LA (US)

(73) Assignee: Marine Turbine Technologies, LLC, Franklin, LA (US)

( * ) Notice: Subject to any disclaimer, the term of this patent is extended or adjusted under 35 U.S.C. 154(b) by 95 days.

(21) Appl. No.: 16/371,753

(22) Filed: Apr. 1, 2019

(51) Int. Cl.
*F23R 3/28* (2006.01)
*F02C 7/22* (2006.01)
*F02C 7/32* (2006.01)

(52) U.S. Cl.
CPC ............. *F02C 7/222* (2013.01); *F02C 7/32* (2013.01); *F23R 3/28* (2013.01)

(58) Field of Classification Search
CPC .... F02C 7/22; F02C 7/222; F23R 3/28; F23R 3/283
See application file for complete search history.

(56) References Cited

U.S. PATENT DOCUMENTS

| | | |
|---|---|---|
| 1,405,360 A | 1/1922 | Turner |
| 2,946,185 A | 7/1960 | Bayer |
| 3,871,063 A * | 3/1975 | Halvorsen ............ B23K 1/0008 29/890.143 |
| 4,028,888 A * | 6/1977 | Pilarczyk ................ F23R 3/283 60/798 |
| 4,100,733 A * | 7/1978 | Striebel ................... F23R 3/286 239/419.3 |

(Continued)

OTHER PUBLICATIONS

"Army Aircraft Gas Turbane Engines", Subcourse AL0993 Edition 5, published by The Army Institute for Professional Development and others in multiple locations and sites and found most recently at militarynewbie.com/.../US-Army-aviation-course-Gas-Turbine-Engines-AL0993.pdf; Date unknown, but presumed to have been published more than ane year before Apr. 1, 2019 (372 pp).

(Continued)

*Primary Examiner* — William H Rodriguez
(74) *Attorney, Agent, or Firm* — Young Basile Hanlon & MacFarlane, P.C.

(57) ABSTRACT

A fuel distribution system for a gas turbine powerplant. A fuel injector with a cylindrical body defines a single internal plenum sealed at an engagement end, having multiple axial openings in a midsection, and injection ports in an injection end. A fuel manifold defines a hollow annular fuel chamber with substantially parallel and opposing top and bottom surfaces. One chamber wall includes multiple cylindrical channels extending between the top and bottom surfaces. Each channel is connected through the wall to the fuel chamber. Each channel has securing features to engage corresponding securing features of the fuel injectors. When a fuel injector is inserted through the top surface into one of the channels in the manifold and the securing features engage, the engaging feature protrudes from the top surface, the injection ports protrude from the bottom surface, and the axial openings are in fluid communication with the fuel chamber.

23 Claims, 19 Drawing Sheets

(56) References Cited

U.S. PATENT DOCUMENTS

| | | | |
|---|---|---|---|
| 4,454,711 A | 6/1984 | Ben-Porat | |
| 4,761,959 A | 8/1988 | Romey et al. | |
| 5,269,468 A | 12/1993 | Adiutori | |
| 5,598,696 A | 2/1997 | Stotts | |
| 5,669,218 A | 9/1997 | Greninger | |
| 5,983,642 A * | 11/1999 | Parker | F02C 7/222 60/737 |
| 6,256,995 B1 | 7/2001 | Sampath et al. | |
| 7,530,231 B2 | 5/2009 | Prociw et al. | |
| 7,937,926 B2 * | 5/2011 | Prociw | F23D 11/44 60/39.094 |
| 8,984,887 B2 * | 3/2015 | Berry | F23R 3/286 60/737 |
| 9,267,690 B2 * | 2/2016 | Stoia | F23R 3/283 |
| 9,341,376 B2 * | 5/2016 | Westmoreland, III | F23R 3/286 |
| 9,353,950 B2 * | 5/2016 | Uhm | F23R 3/10 |
| 9,366,440 B2 * | 6/2016 | Berry | F23R 3/286 |
| 9,423,134 B2 * | 8/2016 | Woods | F23R 3/283 |
| 9,506,654 B2 * | 11/2016 | Uhm | F23R 3/286 |
| 9,759,426 B2 * | 9/2017 | Johnson | F23R 3/286 |
| 9,803,866 B2 * | 10/2017 | Yoshino | B05B 1/14 |
| 2004/0040306 A1 * | 3/2004 | Prociw | F02C 7/222 60/740 |
| 2004/0040310 A1 | 3/2004 | Prociw et al. | |
| 2006/0218925 A1 * | 10/2006 | Prociw | F23K 5/06 60/739 |
| 2006/0277913 A1 * | 12/2006 | Fish | F23R 3/60 60/739 |
| 2007/0204622 A1 * | 9/2007 | Patel | F01D 11/003 60/772 |
| 2007/0234724 A1 * | 10/2007 | Prociw | F02C 7/222 60/740 |
| 2008/0016870 A1 * | 1/2008 | Morenko | F23R 3/283 60/739 |
| 2008/0047274 A1 * | 2/2008 | Fish | F02C 7/222 60/772 |
| 2008/0053096 A1 * | 3/2008 | Morenko | F23D 11/383 60/734 |
| 2008/0072599 A1 * | 3/2008 | Morenko | F02C 3/145 60/734 |
| 2008/0072601 A1 * | 3/2008 | Morenko | F02C 3/145 60/739 |
| 2008/0083223 A1 * | 4/2008 | Prociw | F02C 7/222 60/739 |
| 2009/0044537 A1 | 2/2009 | Boardman et al. | |
| 2009/0120522 A1 * | 5/2009 | Ziaei | F02C 7/222 138/115 |
| 2009/0126368 A1 * | 5/2009 | Patel | F02C 7/22 60/739 |
| 2010/0050645 A1 * | 3/2010 | Haggerty | F02C 7/222 60/739 |
| 2010/0051726 A1 * | 3/2010 | Houtman | F02C 7/222 239/548 |
| 2010/0077758 A1 * | 4/2010 | Rudrapatna | F02C 7/222 60/739 |
| 2010/0096037 A1 | 4/2010 | Lee et al. | |
| 2010/0146928 A1 * | 6/2010 | Morenko | F02C 7/222 60/39.094 |
| 2010/0263382 A1 | 10/2010 | Mancini et al. | |
| 2013/0247574 A1 * | 9/2013 | Patel | F23K 5/06 60/734 |
| 2015/0176496 A1 * | 6/2015 | Zordan | F02C 7/228 60/739 |
| 2015/0253009 A1 | 9/2015 | Bandaru et al. | |
| 2016/0116168 A1 | 4/2016 | Bandaru et al. | |
| 2016/0201562 A1 | 7/2016 | Chasse, Jr. et al. | |
| 2017/0122566 A1 | 5/2017 | Piersall et al. | |
| 2017/0211480 A1 | 7/2017 | Myers et al. | |
| 2018/0163635 A1 | 6/2018 | Marocchini et al. | |
| 2018/0363899 A1 | 12/2018 | Johnson et al. | |
| 2018/0363908 A1 | 12/2018 | Graham et al. | |
| 2018/0363912 A1 | 12/2018 | Graham et al. | |

OTHER PUBLICATIONS

Affidavit of Mr. John Godman Under 37 CFR 1.132, Dated Feb. 10, 2021 (23 pages).

* cited by examiner

FUEL DISTRIBUTION SYSTEM FOR GAS TURBINE ENGINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The field of endeavor concerns fuel input distribution systems for gas turbine engines such as annular reverse-flow free-power turbine powerplants.

2. Description of the Related Art

In the Lycoming model T-53 gas turbine engine, fuel flows through primary and secondary lines to a main fuel manifold assembly. The manifold is a two-section, dual-channeled assembly with eleven outlets in each section. Each manifold half is interchangeable. There are twenty-two fuel atomizers, attached directly to the manifolds, which discharge the atomized fuel into the combustion chamber.

Each fuel atomizer is a dual orifice injector designed to accommodate the separate primary and secondary fuel flow functions. The separate orifices spray fuel into the combustion chamber through the action of the flow divider. Fuel entering the primary section of the atomizer passes through the primary screen and continues to flow through the center of the nozzle to the swirl chamber located internally in the head of the nozzle. Here it passes through three swirl slots and is discharged into the combustion chamber at a ninety degree spray angle. The fine spray density established by the primary slots is required to start and run the engine. Higher N1 speeds require additional fuel and a heavier density spray pattern; therefore, secondary fuel is introduced through the nozzle at speeds above 32% N1. The secondary flow enters the outer shell of the nozzle and passes through the secondary screen and into the secondary swirl slots. The secondary swirl slots, being slightly larger in size than the primary swirl slots, allow a greater volume of fuel to be discharged into the combustor. The combination of primary and secondary flow which is delivered to the combustor at an optimum spray angle of 90° is sufficient to operate the engine at all power settings above 32% N1.

The previous summary is excerpted from the Army Institute for Professional Development, Army Correspondence Program, "Army Engine Gas Turbine Engines," Subcourse AL0993, Edition 5.

The following a description of a particular problem confronting the inventors. Recognition of the problem itself is not admitted prior art, as the inventors' identification and analysis of the problem constitutes a meaningful part of the inventive process. Despite not being admitted prior art, the inventor's recognition of the problem presented helps provide some illustrative background, so it appears in this section for the sake of context. The specific problem confronting the inventors includes the following issue with the fuel supply system of a Lycoming T-53 annular reverse-flow free-power turbine powerplant. Namely, although the fuel manifold may be adequate for some users or applications, the inventors found the fuel manifold might be cumbersome and expensive to remove for some users. The servicing of a single one of the multiple injectors requires removal of an entire half. As recognized by the inventors, this increases down time, decreases engine utility, and increases engine operating costs.

Furthermore, the traditional T-53 fuel manifold is installed with expensive single-use crush washers between the manifold and the engine. Every time the manifold is removed, this requires replacing all of the disposable crush washers upon reinstallation. This is expensive and labor intensive.

A secondary problem confronting the invention is the complexity of the fuel injectors and manifold, and in particular, the dual orifice nature of the fuel injectors and the dual channel nature of the manifold. Traditionally, an electromechanical control system uses one orifice/channel combination for engine starting and running, and the other orifice/channel combination for higher engine speeds. The inventors have discovered that this arrangement is more complicated and therefore less reliable that it could be, and additionally more expensive to manufacture and operate that might be possible.

SUMMARY OF THE INVENTION

A fuel distribution system for an annular reverse-flow free-power turbine powerplant has several aspects. One aspect is a fuel injector. An exemplary fuel injector comprises a substantially cylindrical body having opposing ends including an engagement end and an injection end. The engagement end includes an engaging feature, and the body includes a single internal plenum sealed at the engagement end. The plenum has external openings including (1) multiple axial openings in a midsection of the body and (2) multiple injection ports defined in the injection end. The boy also includes a first securing feature.

Another aspect of the fuel distribution system is a fuel manifold. An exemplary fuel manifold includes multiple walls defining a single hollow annular fuel chamber. The walls include upper and lower walls defining substantially parallel opposing top and bottom surfaces. The walls also include circumferentially inner and outer side walls connecting the upper and lower walls. A designated one of the side walls has multiple substantially cylindrical channels extending between the top and bottom surfaces. Each of these channels is connected to the fuel chamber via the designated wall. Each channels includes a second securing feature shaped and sized to engage one of the first securing features.

The size and shape of each fuel injector body relative to the fuel manifold provides that when said injector is inserted through the top surface into one of the channels in the manifold and the first and second securing features engage to fix the fuel injector in place, the following relationship occurs. The engaging feature protrudes from the top surface while the injection ports protrude from the bottom surface and the axial openings are in fluid communication with the fuel chamber.

INDEX OF NUMERIC REFERENCES

Figure 1:
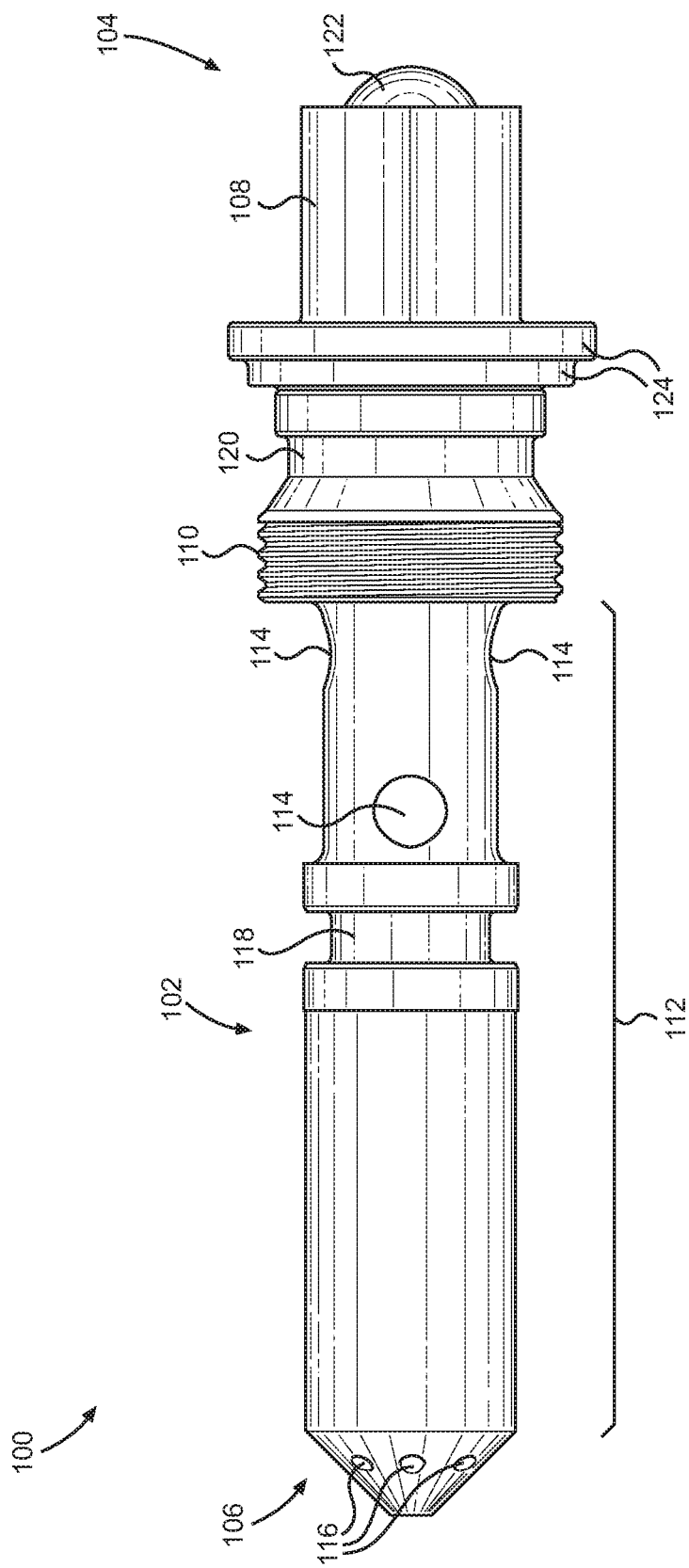
FIG. 1 is side plan view of a fuel injector.
Figure 2:
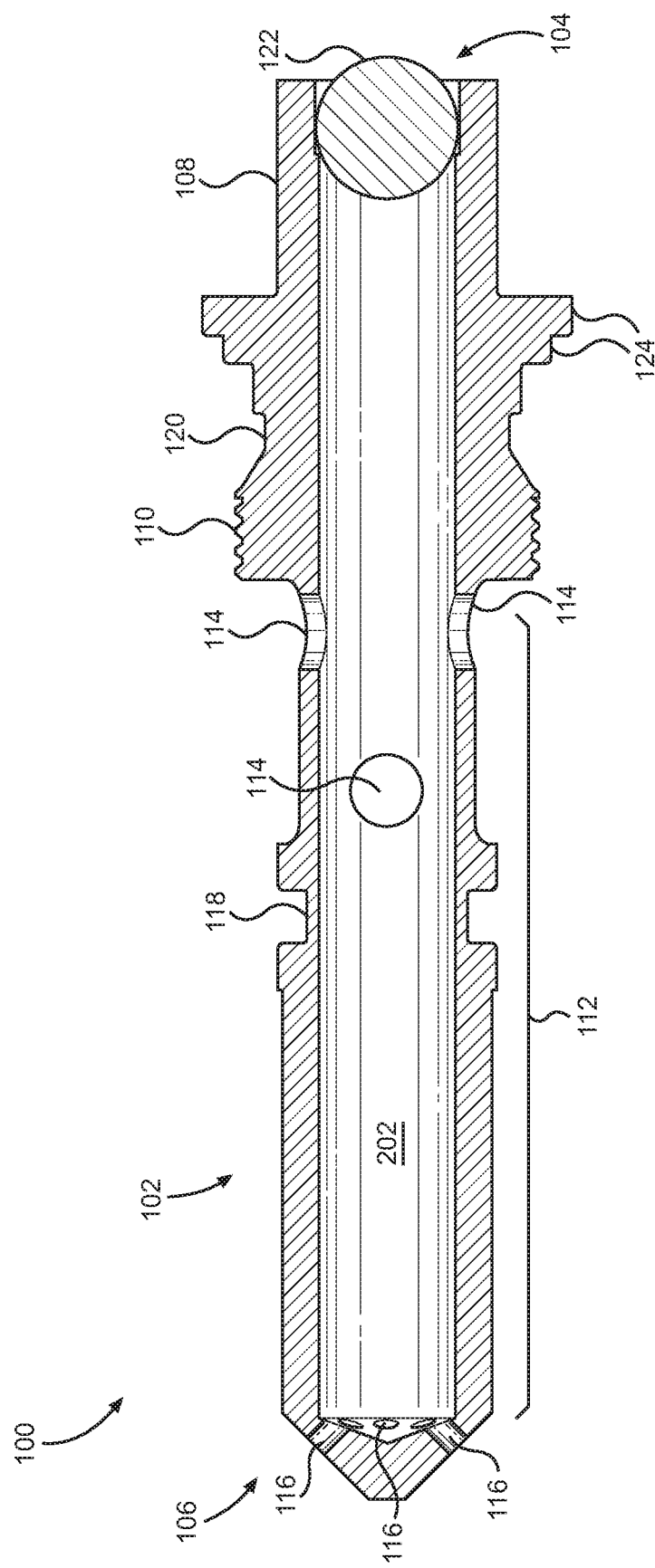
FIG. 2 is a cutaway side plan view of a fuel injector.
Figure 3:
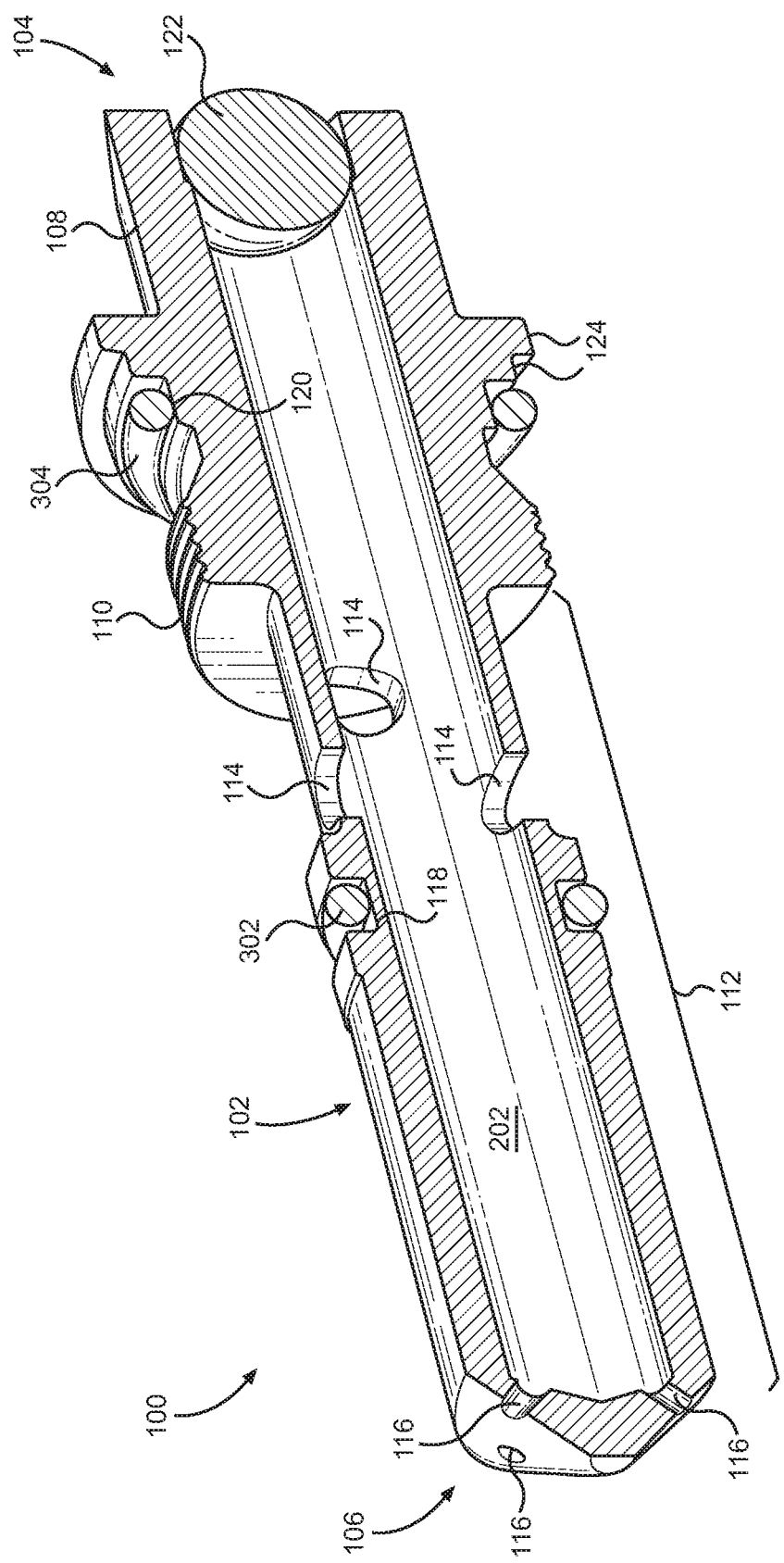
FIG. 3 is a cutaway perspective view of a fuel injector.
Figure 4:
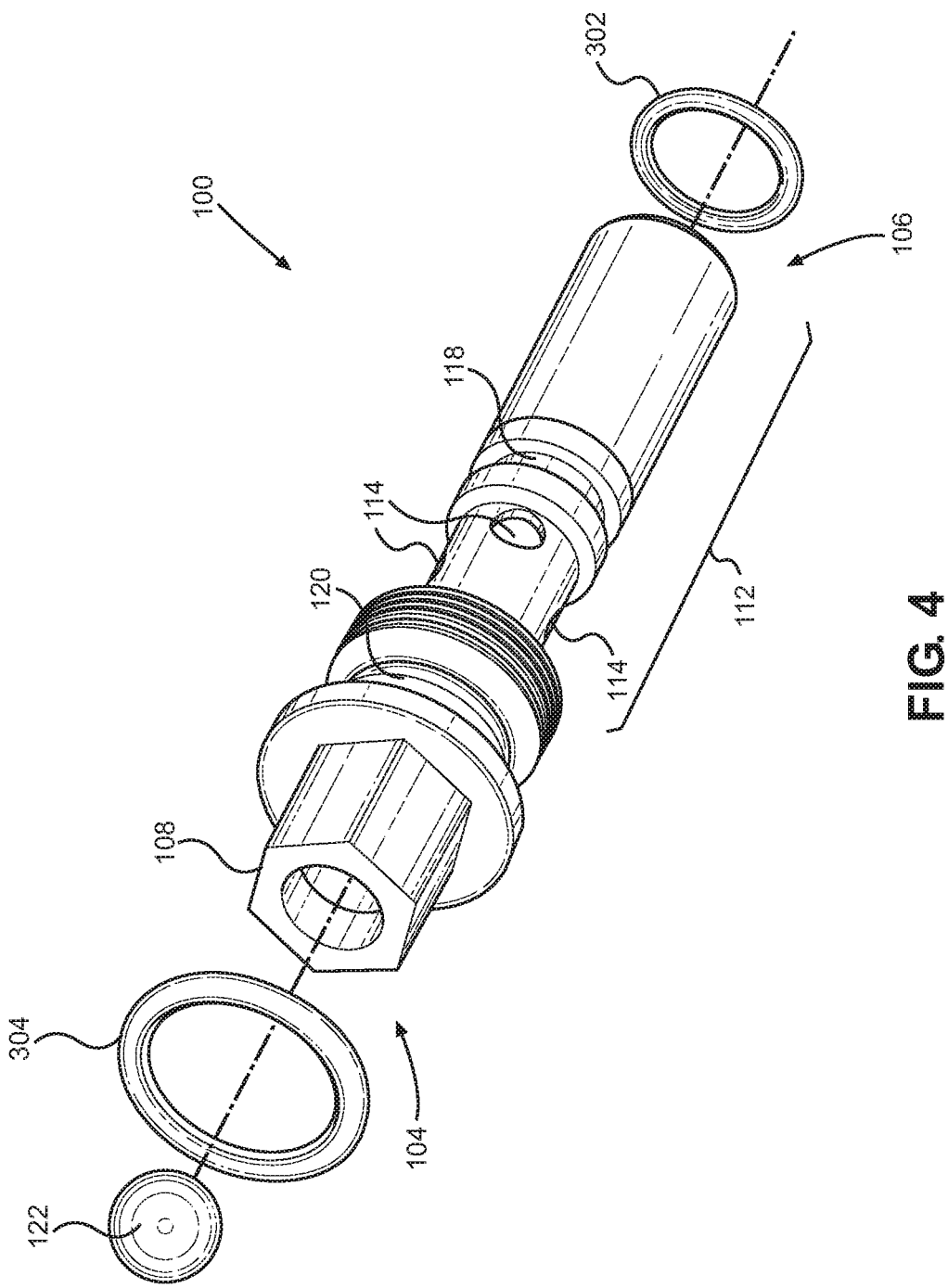
FIG. 4 is a first exploded perspective view of a fuel injector.
Figure 5:
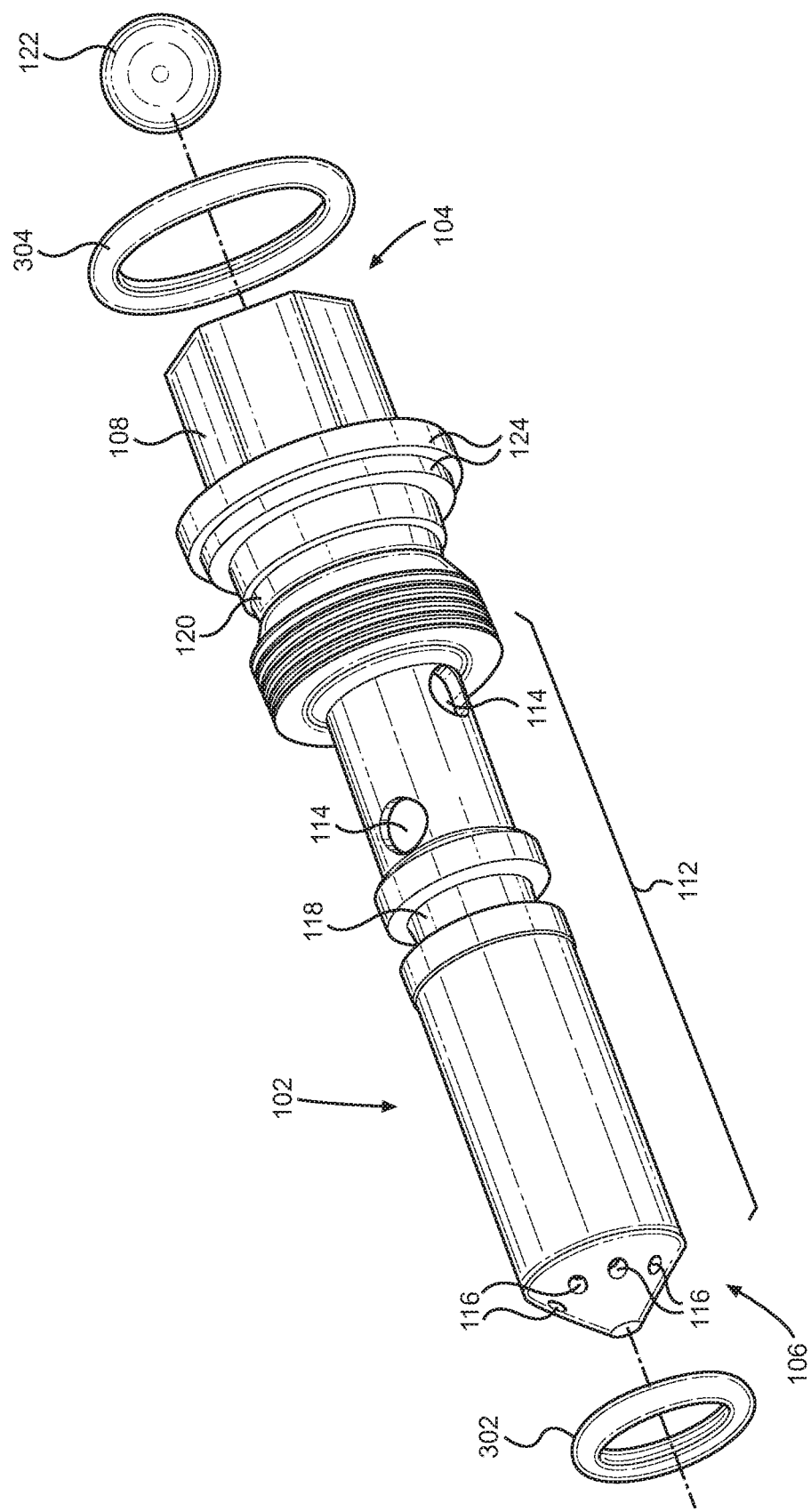
FIG. 5 is a second exploded perspective view of a fuel injector.

| Reference Number | Name (one example) |
|---|---|
| 100 | fuel injector |
| 102 | body |
| 104 | engagement end |
| 106 | injection end |
| 108 | engaging feature |
| 110 | securing feature |
| 112 | midsection |
| 114 | intake ports |
| 116 | injection ports |
| 118 | distal recess |
| 120 | proximal recess |
| 122 | plug |
| 124 | flanges |
| 202 | internal plenum |
| 302 | distal o-ring |
| 304 | proximal o-ring |
| 600 | fuel manifold |
| 602 | first manifold half |
| 604 | second manifold half |
| 606 | top surface |
| 608 | bottom surface |
| 610 | outer wall |
| 612 | thinned annular band |
| 614 | top extension |
| 616 | bottom extension |
| 618 | first insert |
| 620 | second insert |
| 622 | fuel supply openings |

INDEX OF NUMERIC REFERENCES

| Reference Number | Name (one example) |
|---|---|
| 624 | attachment openings |
| 626 | bevel |
| 700 | fuel chamber |
| 704 | injector channel |
| 706 | top injector opening |
| 708 | bottom injector opening |
| 710 | seating features |
| 712 | securing feature |
| 902 | fuel supply fitting |
| 1604 | attachment openings |
| 1606 | mounting surface |
| 1608 | fuel injector receivers |
| 1610 | fasteners |
| 1802 | fuel flow |
| 1804 | fuel flow |
| 1806 | fuel flow |
| 1808 | fuel flow |
| 1810 | fuel supply line |

DETAILED DESCRIPTION

The nature, objectives, and advantages of the invention will become more apparent to those skilled in the art after considering the following detailed description in connection with the accompanying drawings.

Hardware Components and Interconnections

Overall Structure

The present disclosure relates to a fuel distribution system for an annular reverse-flow free-power turbine powerplant. One further aspect of this disclosure concerns a novel fuel injector intended for use with certain makes and models of gas turbine engines. Another further aspect concerns a fuel manifold specifically designed to receive the novel fuel injectors described herein. Compared to known approaches, this novel arrangement facilitates rapid and individual servicing of the fuel injectors, which simply was not possible with prior arrangements. This system is also less expensive to operate and more reliable, and also provides other benefits as described below.

Fuel Injector

FIGS. 1-5 shows an exemplary fuel injector. A fuel injector 100 includes a substantially cylindrical body 102 with an engagement end 104 and an injection end 106. The fuel injector 100 may be manufactured from metal such as stainless steel, titanium, tungsten, or another metal or metal alloy or providing characteristics appropriate to the construction and uses described herein. The fuel injector may be manufactured from a non-metallic substance such as a ceramic material.

At the engagement end 104, the body includes an engaging feature 108 shaped to receive a predetermined tool for removal and installation of the injector. In the instant example, the feature 108 comprises a section of the body 102 with a hexagonal cross-section to facilitate engagement by a hex style wrench or socket. The engaging feature 108 may alternatively have the shape of an octagon or any other polygon, or a completely different feature such as a slot or "X" or other shape to engage a slot, Phillips, Torx, star, Allen, or any other design of attachment means.

Adjacent to the engagement end 108, the body includes a securing feature 110. The securing feature 110 may comprise a threaded annular feature 110 as illustrated, or a locking pin or any other mechanism for preventing rotation or extraction or otherwise securing the fuel injector 100 in place. In one example, the annular feature includes threads that are raised with respect to the body 102. The threads 110 are configured to engage mating threads in a fuel manifold, as described in greater detail below.

Toward the injection end 106 of the body 102, the body 102 includes a midsection 112. Internal to the midsection 112 is a single internal plenum. The plenum is illustrated by item 202 in FIGS. 2-3. The plenum 202 is sealed at the engagement end 104 and has external openings that include (1) one or more intake ports 114 in the midsection 112 and (2) multiple injection ports 116 in the injection end 106.

In one example, there are four intake ports 114. In this example, two intake ports 114 are located near the securing feature 110, located on opposite sides of the body 102, and two more are located nearer to the injection end 106, also located on opposite sides of the body 102, as illustrated in the drawings. The centerline common to one pair of axial openings, in this example, is perpendicular to the center line of the second pair of axial openings. Alternatively, the intake ports 114 may be laid out in a different pattern, such as distributed evenly around the circumference of the fuel injector 100, or using a greater or lesser number of openings. As illustrated, all intake ports 114 similarly lead to the internal plenum 202.

Turning attention to the injection ports 116, in one example there are eight injection ports 116 distributed evenly about the longitudinal centerline of the body 112 in a circular pattern at the injection end 106 of the fuel injector 100, as shown in the drawings. Alternatively, the injection ports 116 may be laid out in a different pattern or using a greater or lesser number of openings. All injection ports 116 similarly lead to the internal plenum 202.

The fuel injector 100 may include annular recesses to receive sealing features such as o-rings. In the instant example, the injector 100 includes a distal recess 118 and a proximal recess 120. The o-rings are illustrated by items 302 and 304 in FIGS. 3-5. The distal recess 118 is sized to receive a distal o-ring 302, and the proximal recess 120 is sized to receive a proximal o-ring 304.

In one example, the plenum 202 extends nearly throughout the injector body 102, from the injection end 106 to the engagement end 104. The engagement end 104 is sealed by a plug 122 which is welded, press-fit, glued, or otherwise fixed in place to seal the engagement end 104. One example of the plug 122 is a stainless steel sphere welded to the injector body 102. In another example, the plug and injector body comprise a single piece of material, manufactured together, rather than different pieces assembled together.

The injector 100 may include one or more annular flanges 124 to engage with at least one washer, o-ring, application of sealant, or in the alternative, to engage directly to a corresponding seating feature such as a lip or edge or other surface of the fuel manifold described below.

Manifold

Figure 6:
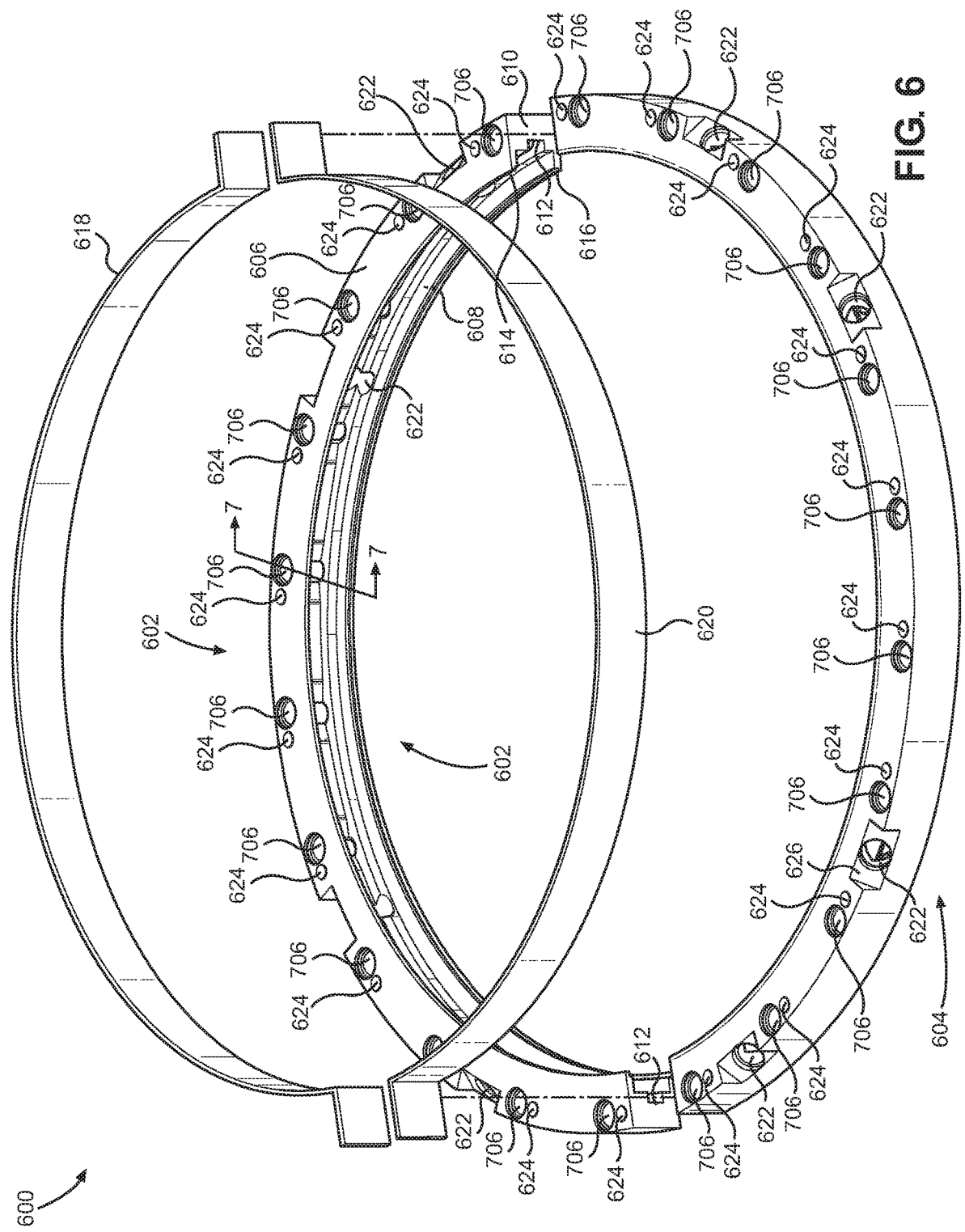
FIG. 6 is a top exploded perspective view of a fuel manifold.
Figure 7:
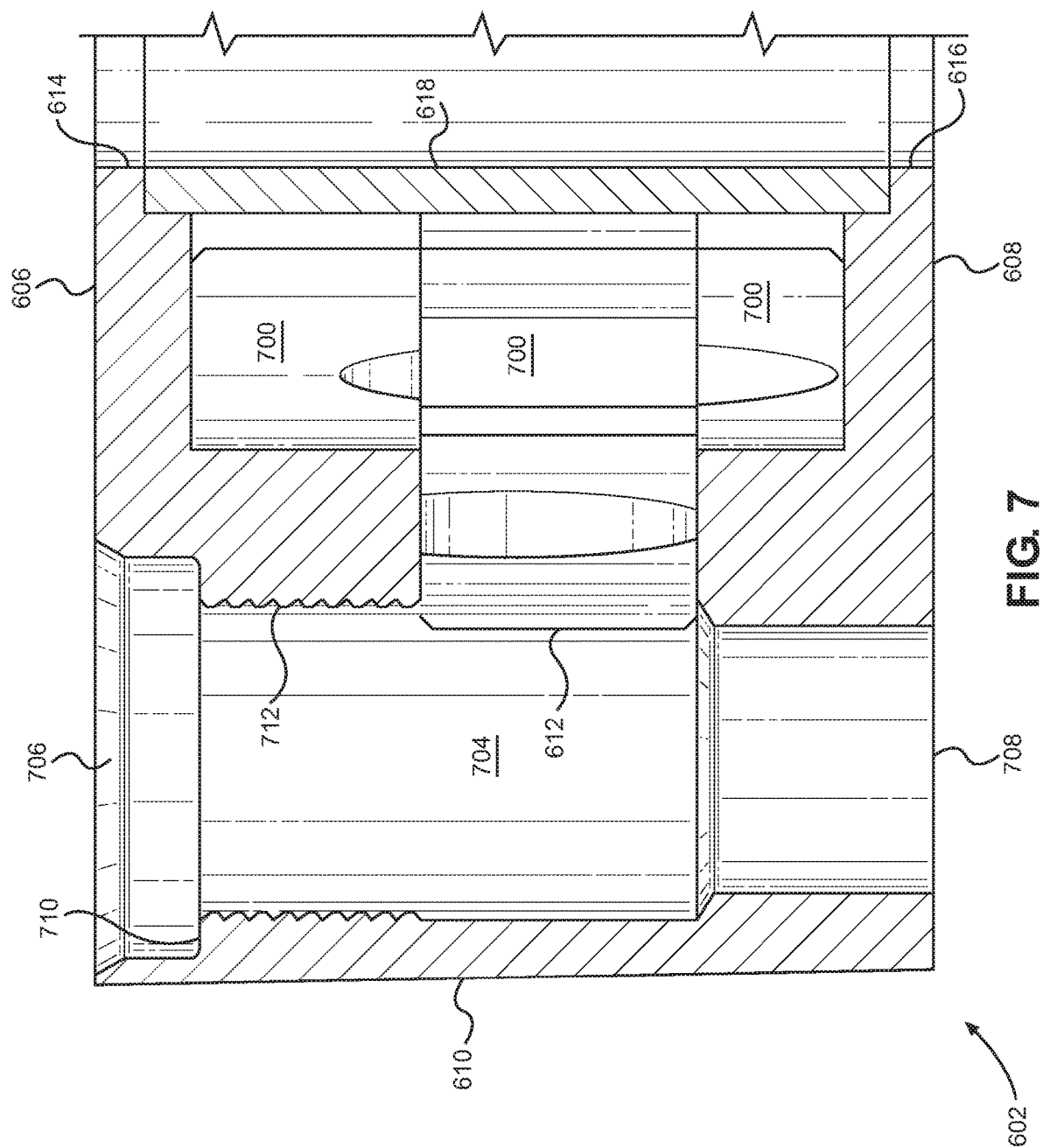
FIG. 7 is a cross sectional side plan view of a fuel manifold.
Figure 8:
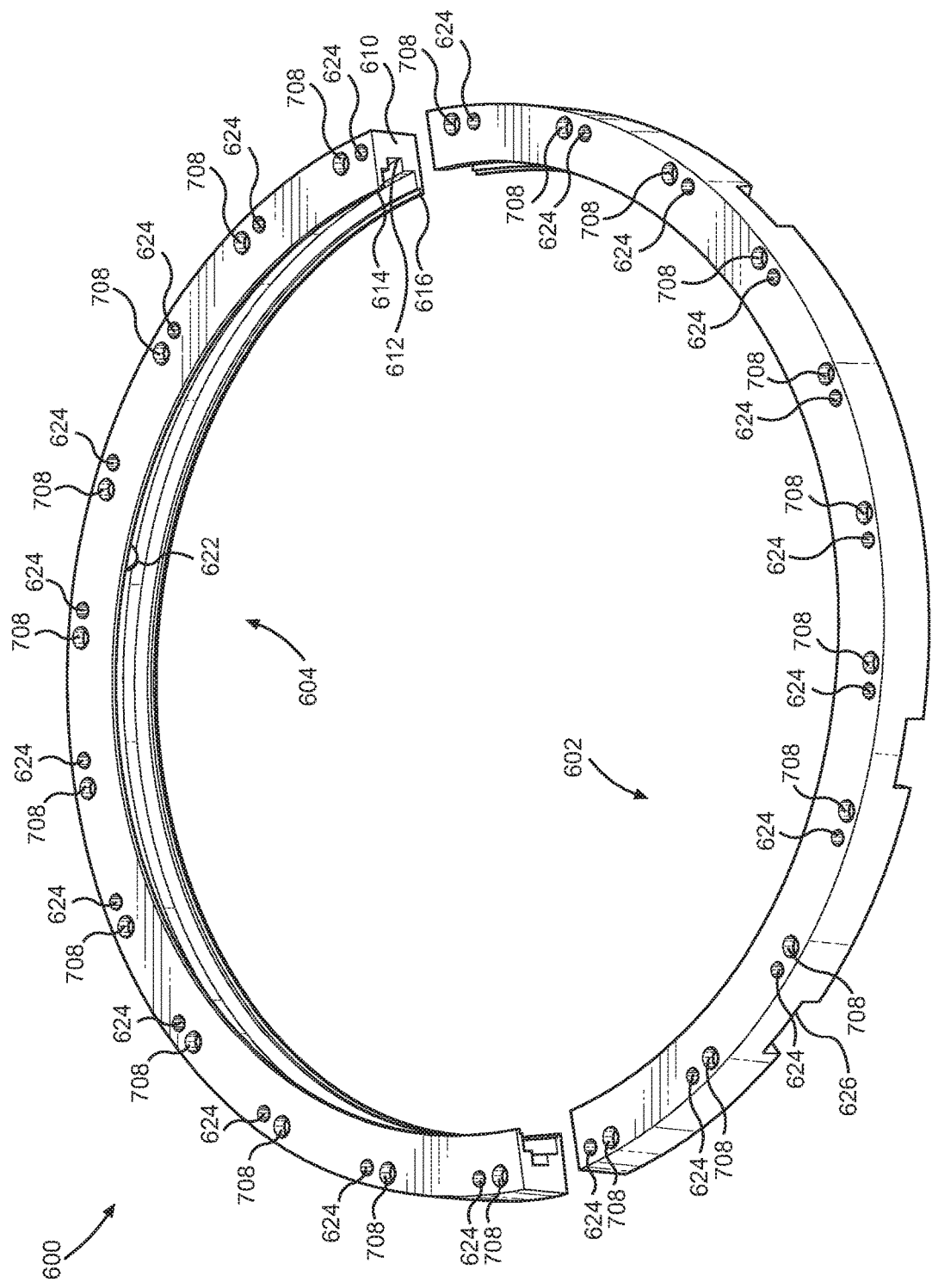
FIG. 8 is a bottom perspective view of a fuel manifold.
Figure 9:
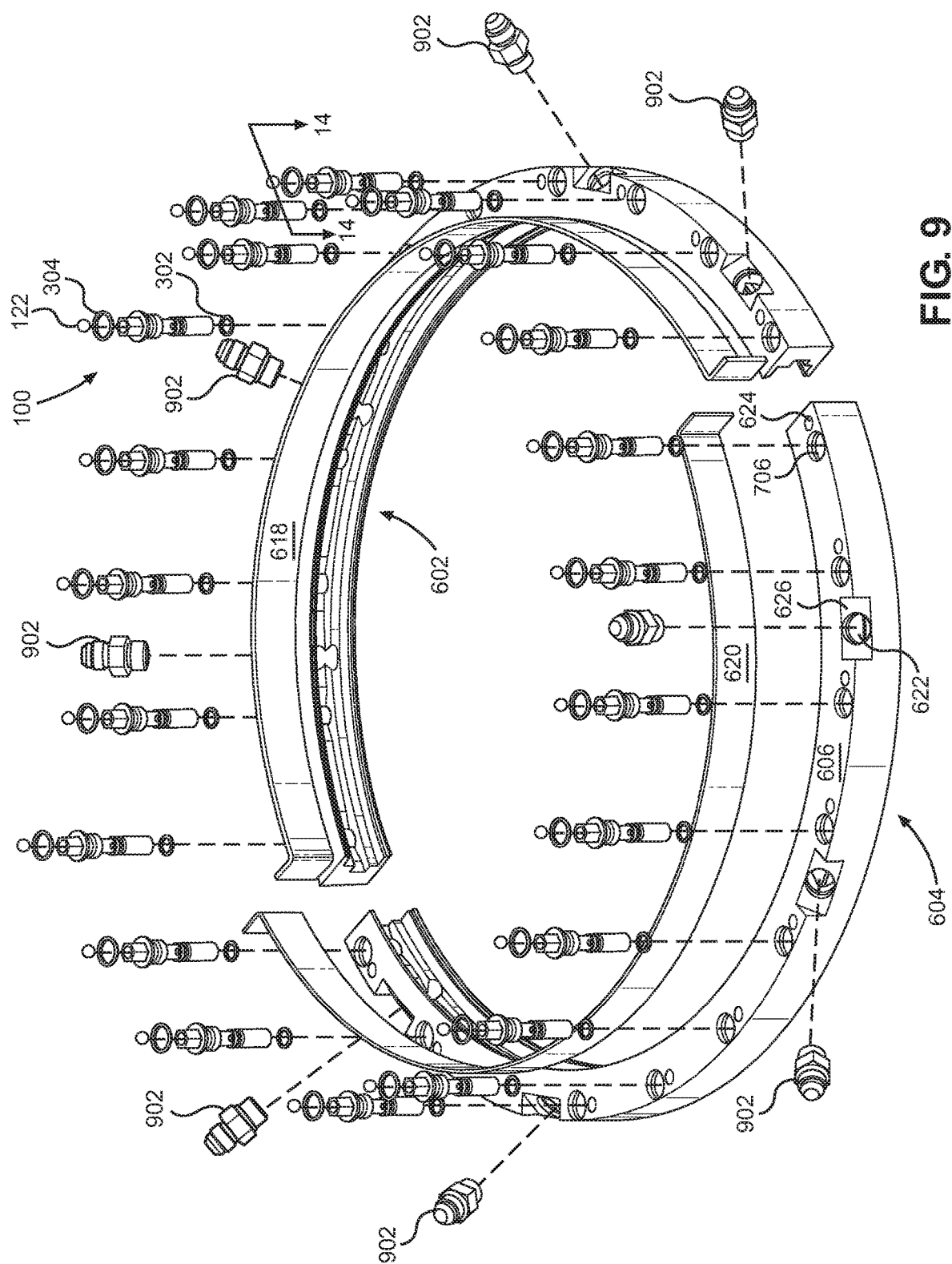
FIG. 9 is a top exploded perspective view of a fuel manifold and fuel injectors and fuel supply fittings.
Figure 10:
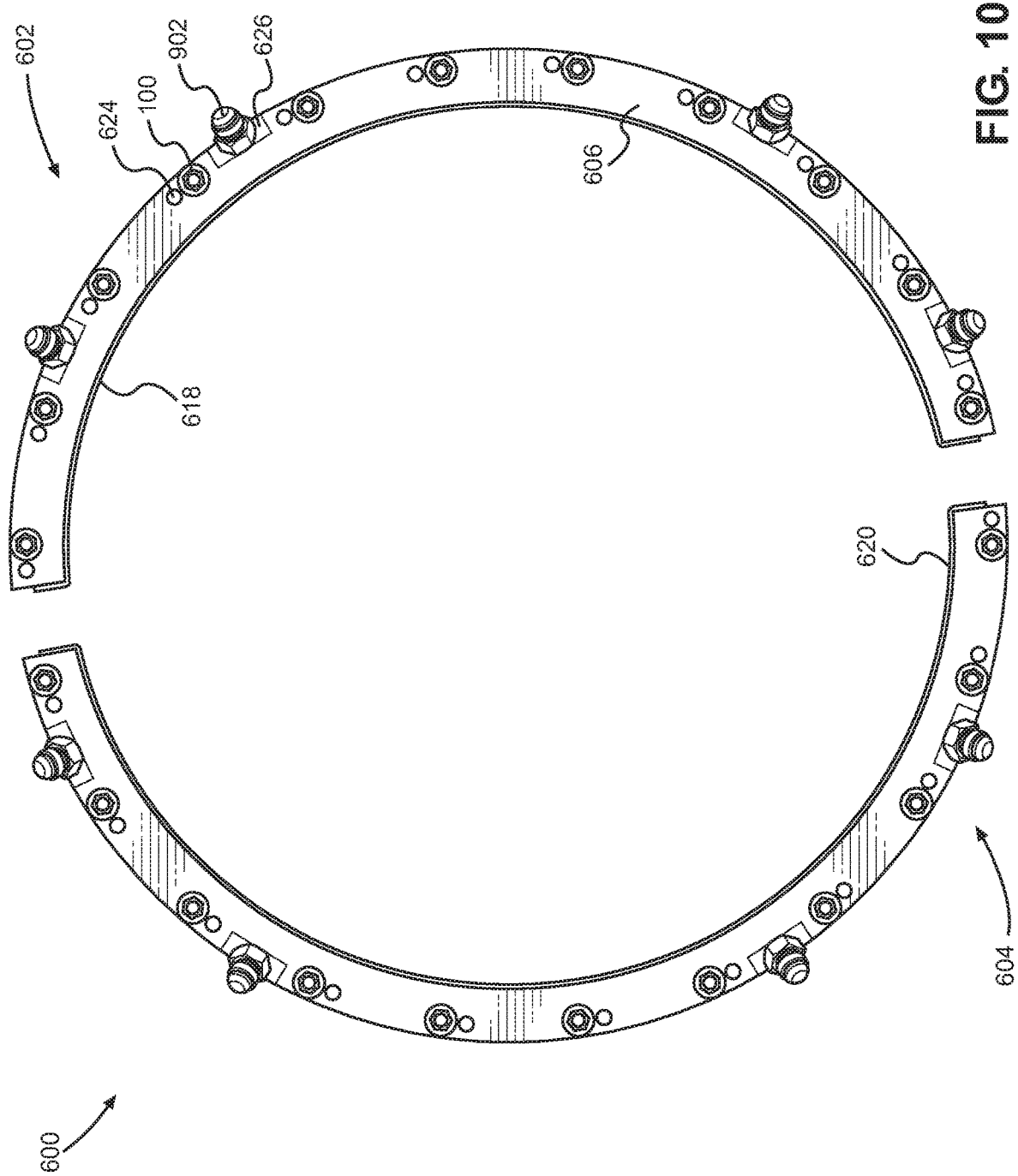
FIG. 10 is a top plan view of a fuel manifold with fuel injectors and fuel supply fittings installed.
Figure 11:
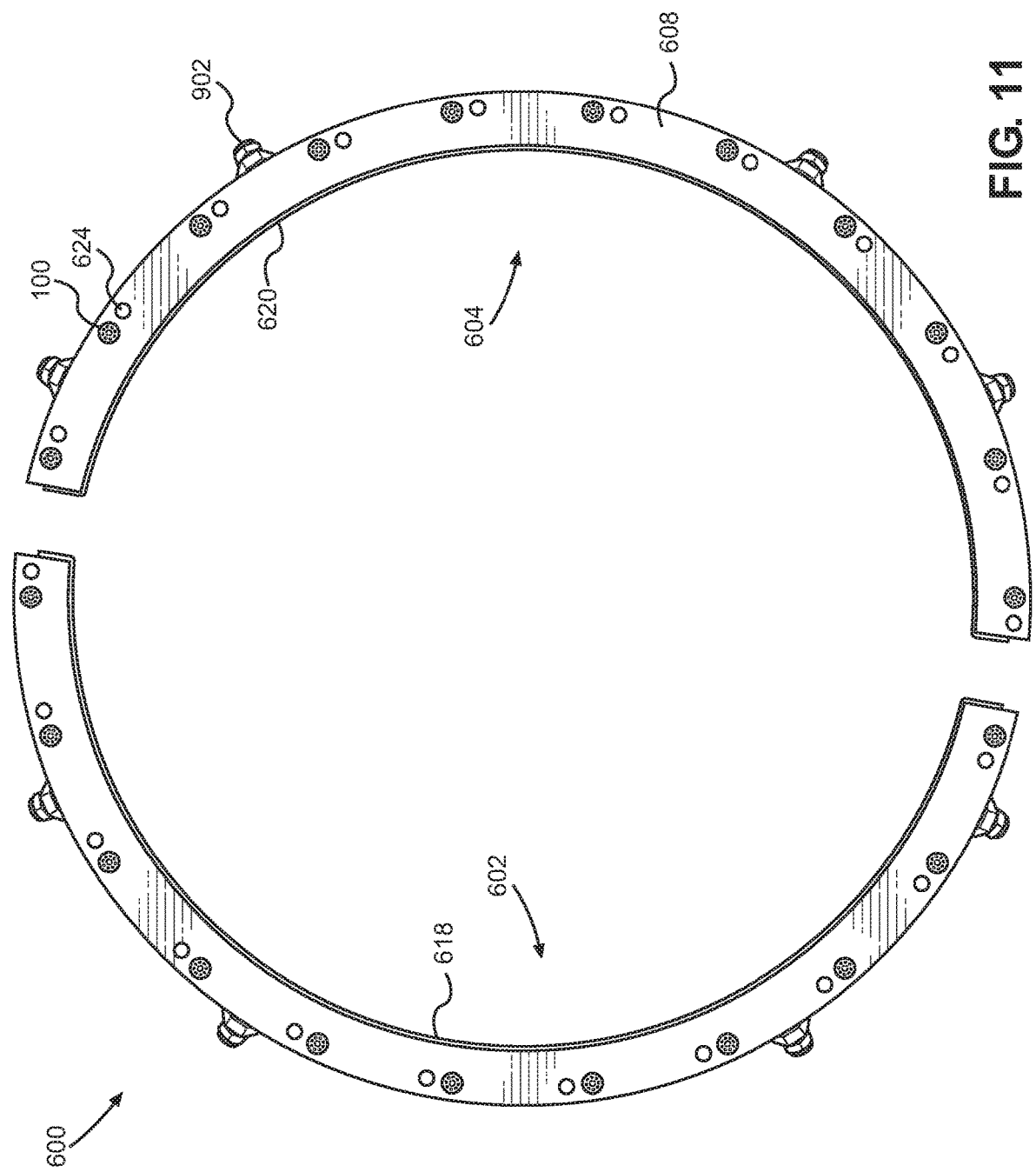
FIG. 11 is a bottom plan view of a fuel manifold with fuel injectors and fuel supply fittings installed.
Figure 12:
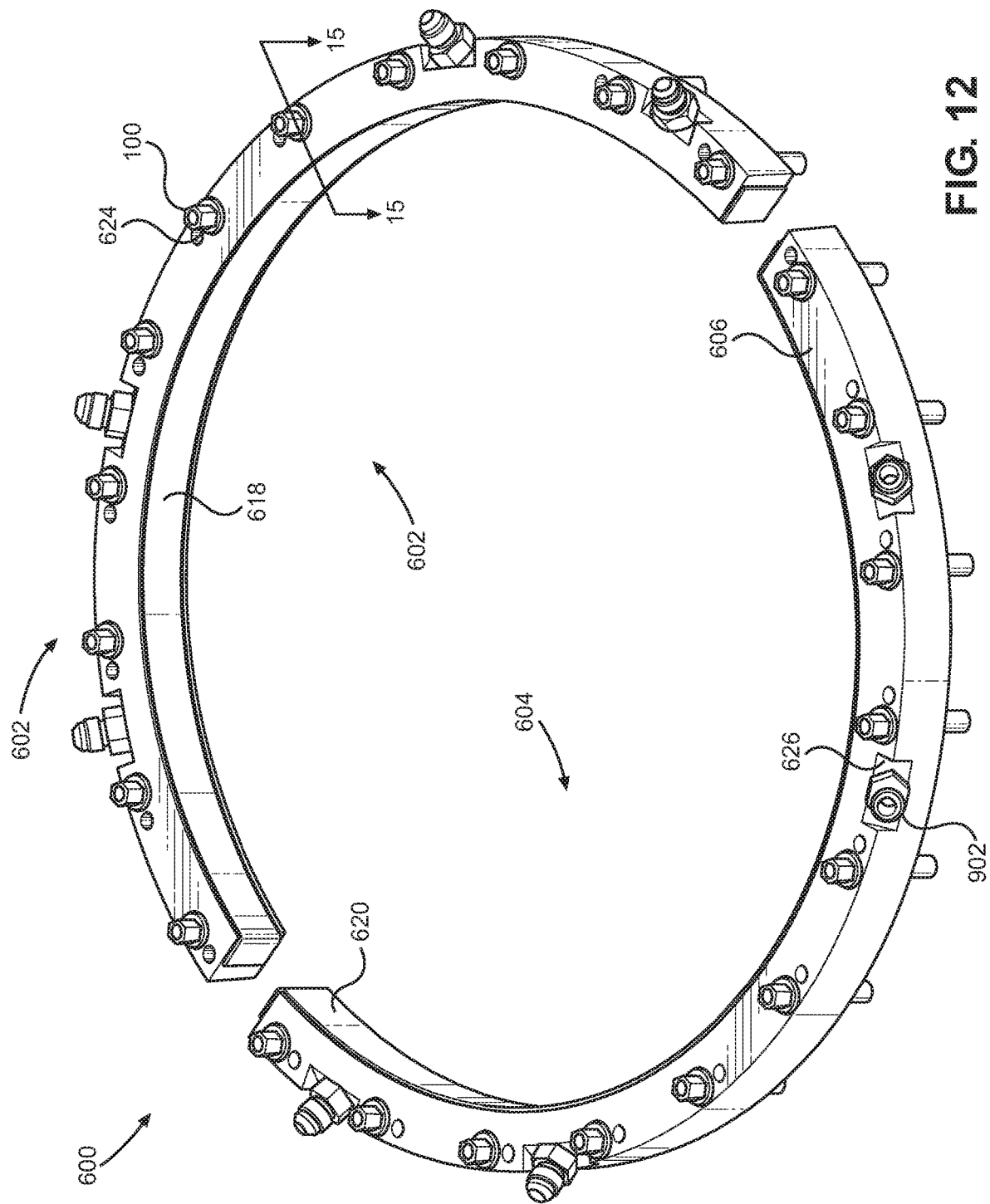
FIG. 12 is a top perspective view of a fuel manifold with fuel injectors and fuel supply fittings installed.
Figure 13:
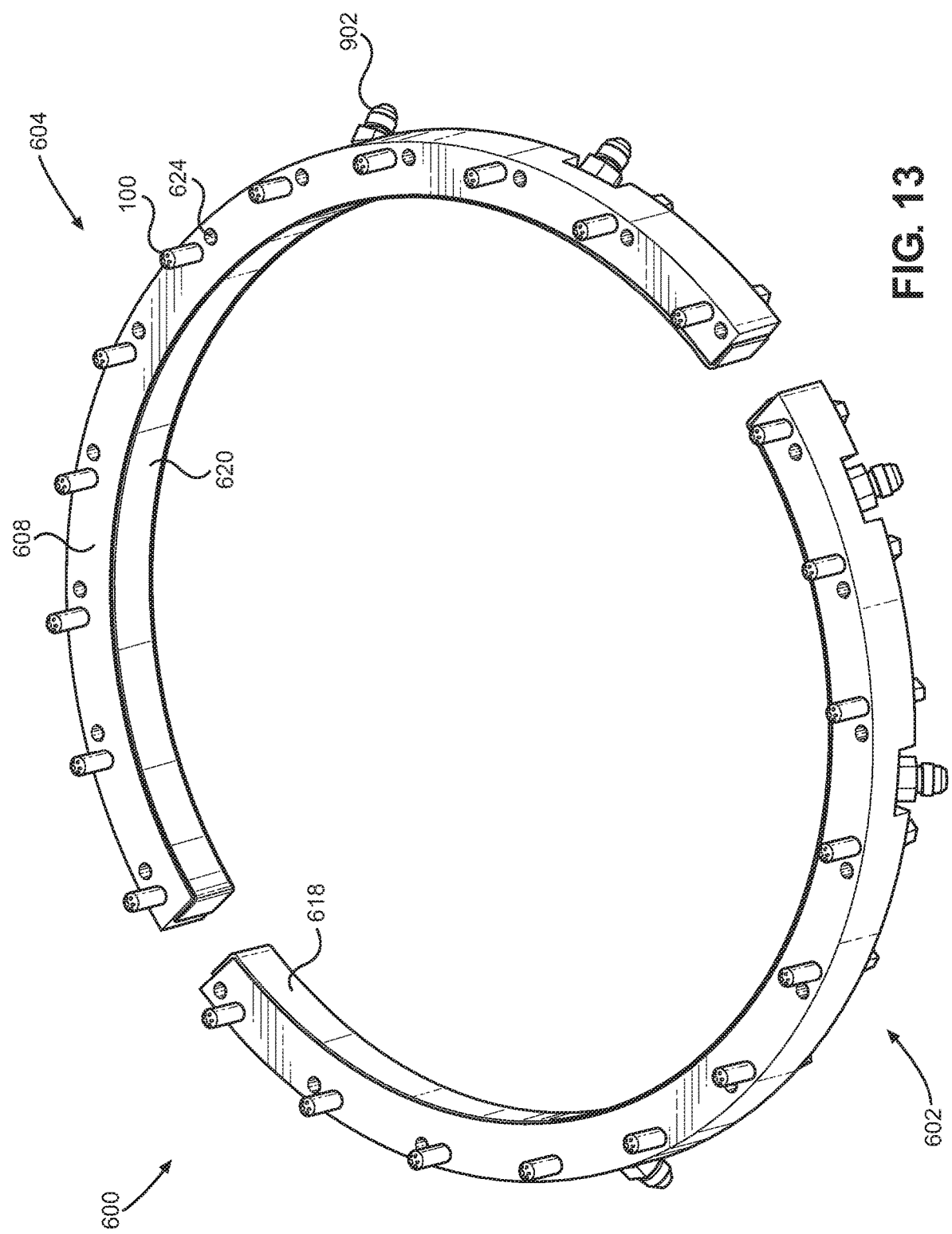
FIG. 13 is bottom perspective view of a fuel manifold with fuel injectors and fuel supply fittings installed.
Figure 14:
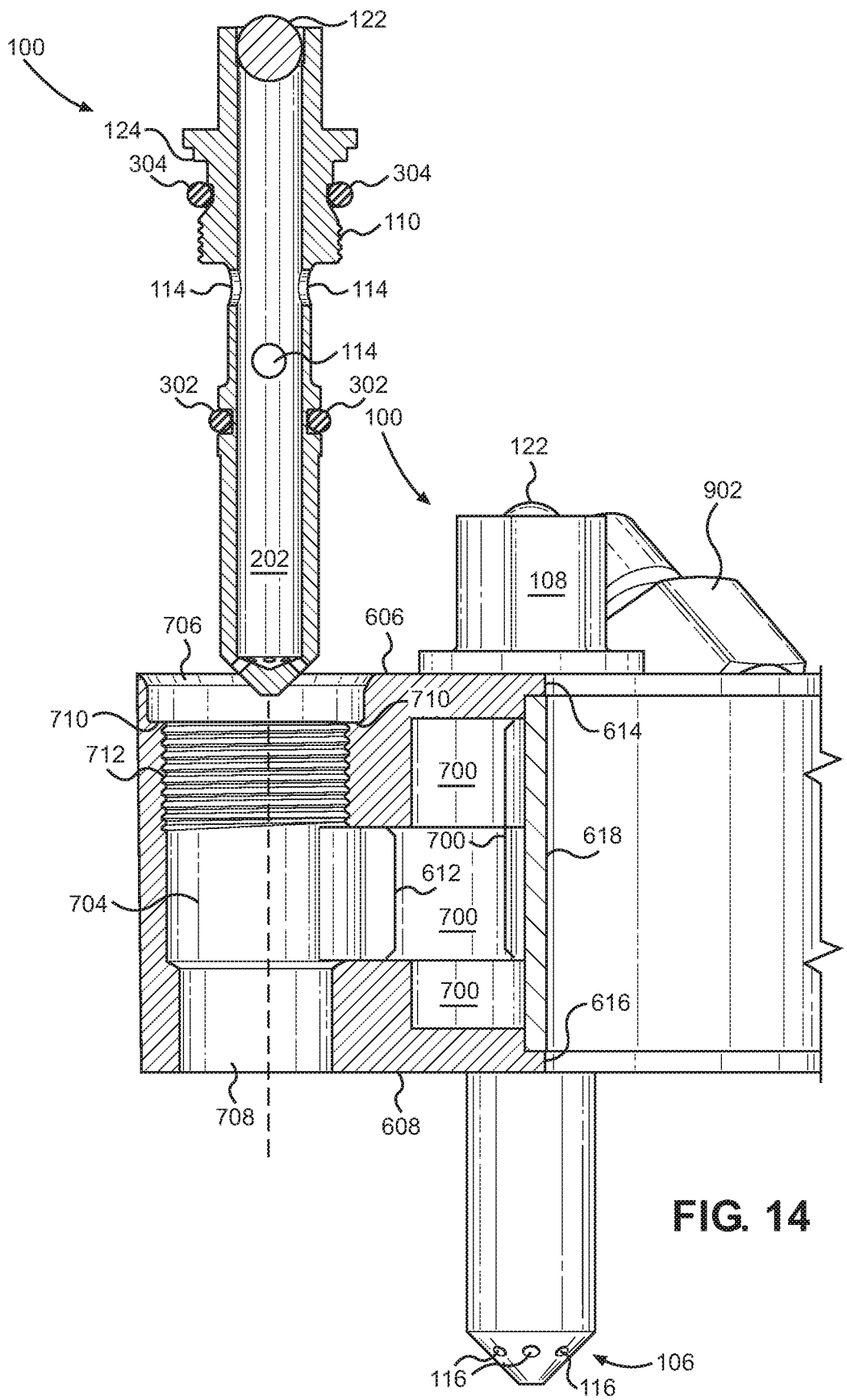
FIG. 14 is a cutaway side plan view illustrating the relationship of installed and uninstalled fuel injectors to a fuel manifold.
Figure 15:
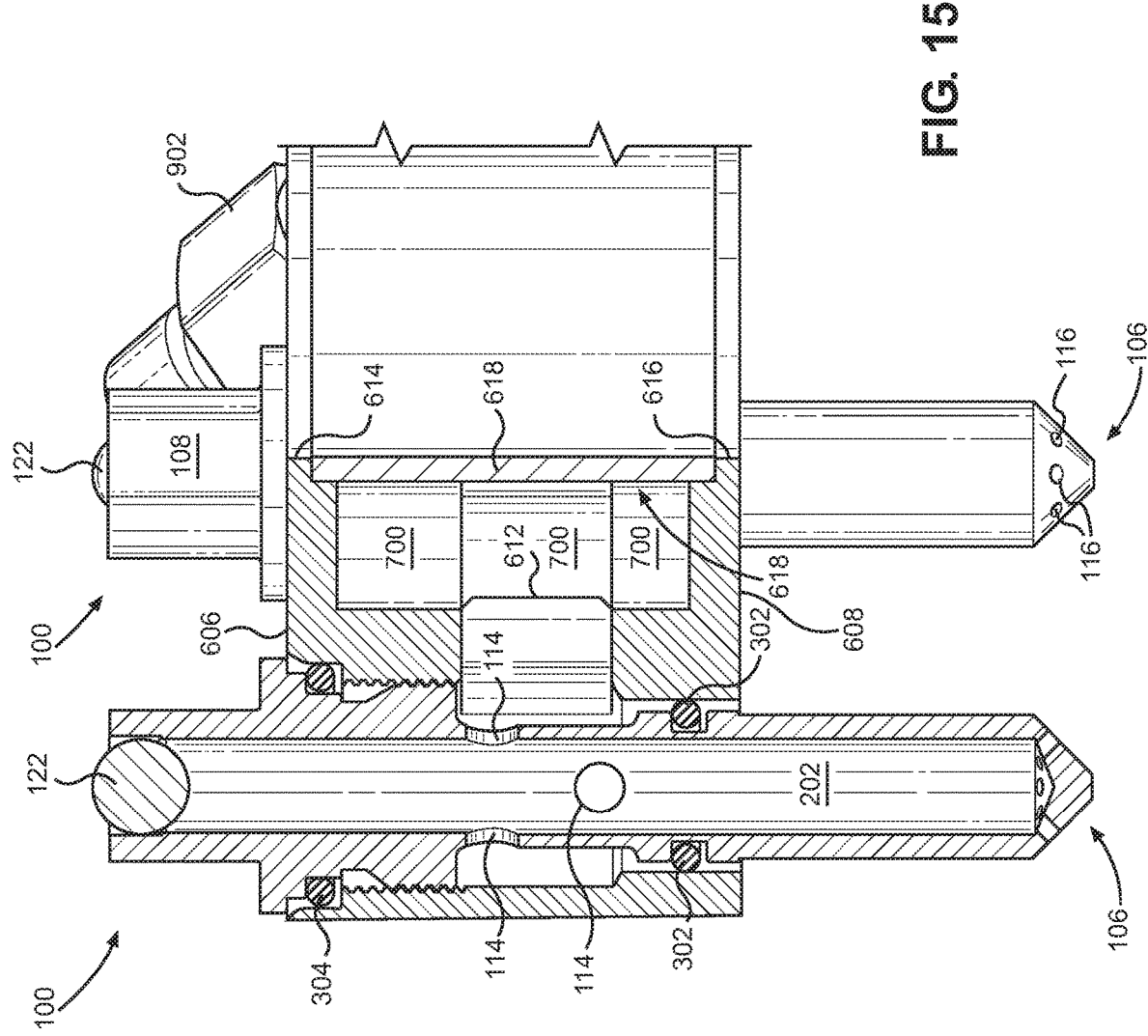
FIG. 15 is a cutaway side plan view of a fuel manifold with installed fuel injectors.

The size and configuration of fuel injectors 100 described herein are specifically designed to mate with a novel fuel manifold, which is described as follows. FIGS. 6-8 illustrate the features of an exemplary fuel manifold.

Broadly, the fuel manifold 600 is an annular single-piece or multi-piece structure that, upon installation, provides a single hollow annular fuel chamber 700. In the illustrated example, the manifold includes a first 602 and second 604 manifold halves. However, the manifold may be unitary or it may use a greater number of pieces than two.

The manifold 600 includes multiple walls that define the fuel chamber 700. In the present example, the manifold includes upper and lower walls connected by side walls. The side walls include circumferentially inner and outer walls. Substantially parallel opposing top 606 and bottom 608 surfaces are defined by the upper and lower walls, respectively. The inner wall is provided by inserts 618-620 as explained below. As for the outer wall, this is a circumferentially outer wall illustrated by 610.

The outer wall 610 has defined therein multiple substantially cylindrical space-apart injector channels, such as 704, extending between the top 606 and bottom 608 surfaces. The wall 610 includes a thinned annular band 612 connecting identical portions of each of the injector channels 704 at the band 612 to the fuel chamber 700. This permits fluid flow from the injector channels 704 into the fuel chamber 700. "Fluids" as used herein may include liquid matter as well as gaseous matter including but not limited to gaseous fuel and air. Alternatively, instead of the thinned annular band 612, the wall may have defined therein multiple ports, conduits, apertures, recesses, or other structure or equipment sufficient to place portions of each of the injector channels 704 in fluid communication with the fuel chamber 700.

In a specific embodiment, each of the manifold halves 602-604 is configured to include top 614 and bottom 616 extensions that abut corresponding inserts 618-620 to define the fuel chamber 700 in that manifold half. In the present example, with two manifold halves, there are corresponding first and second inserts 618-620. In FIG. 6, the inserts 618-620 are shown offset from the manifold halves 602-604 to reveal the internal features of the fuel chamber 700. In FIG. 7, the insert 618 is shown "in place" against the first manifold half 602. The inserts 618-620 are omitted from FIG. 8 to avoid obscuring the features of the manifold 600. An inserts is also shown "in place" against its respect manifold half in each of FIGS. 10-15.

In an alternative embodiment, the roles of the outer wall and inner wall (i.e., inserts) may be reversed. Namely, the above-described features of the outer walls may be implemented in the form of circumferentially inner walls, with the inserts being provided in a circumferentially outer position.

When inserts 618-620 are placed against the manifold halves 602-604, and the manifold halves 602-604 are abutted to each other, the "C" shape of each manifold piece 602-604 (when viewed cross-sectionally), together with its corresponding insert 618-620, defines a single fuel chamber 700. In practice, the inserts 618-620 may be welded, glued, pressed, heated, or otherwise attached to their corresponding manifold halves 602-604.

Each channel injector 704 includes a top injector opening 706 in the top surface 606 and a bottom injector opening 708 in the bottom surface 608. Each channel 704 may include seating features 710 such as one or more rings, flanges, channels, or other structure designed to sealably seat o-rings, washers, and/or corresponding features of one of the fuel injectors 100 themselves. Each injector channel 704 also defines a securing feature 712 such as threads or a locking pin or another mechanical structure configured to receive and engage with the securing feature 110 of each fuel injector 100.

Also defined in the top surface 606 of the manifold 600 are various fuel supply openings 622, best shown in FIG. 6. The fuel supply openings 622 are shaped and sized to fit a predetermined shape and size of fuel supply fitting. The openings 622 pass through a bevels (such as 626) and connect with the fuel chamber 700. Fuel supply fittings are illustrated by reference 902 in FIGS. 9-15, and described in greater detail below.

In addition to the fuel supply openings 622, the top surface 606 may also include attachment openings 624 designed to accommodate bolts, screws, or other fasteners for attaching the fuel manifold 600 to a mounting surface of a gas turbine engine.

Manifold-Injector Fit

Having described the fuel injectors and manifold, the next description focuses on the fit between the manifold and its various attachments. In this regard, reference is made to FIGS. 9-15. The injection end 106 of a fuel injector 100 is inserted through the top injector opening 706 of the injector channel 704 of the manifold 600, continuing downward (as illustrated) through the channel 704, and through the bottom injector opening 708. Thus, when installed, the injection end 106 and its injection ports 116 extend past the bottom surface 608 and protrude from the manifold 600.

In the illustrated example, rotating the fuel injector 100 causes the raised threads 110 to engage with the corresponding threads 712 inside the channel 704. At this point, the flanges 124 engage with the seating features 710 and the o-rings 302/304 form a seal against the surface of the channel 704.

The various fuel supply fittings 902 are inserted into the fuel supply openings 622 and threadably engaged therein. The fuel supply fittings 902 are earlier or later connected to fuel supply lines, described below, such as hoses or conduits made of metal, rubber, or any other suitable durable and flexible or rigid material appropriate to the particular application.

OPERATION

Having described the structural features of the present disclosure, the operational aspects of the disclosure will now be described. Without any intended limitation, the operational aspects are described and illustrated in the context of a LYCOMING model T-53 engine. With few if any changes, these concepts are applicable by analogy to the LYCOMING model T-55 engine. Ordinarily skilled artisans having the benefit of this disclosure may implement this disclosure in the context of further gas turbine engines not illustrated herein but whose structure, operation, and componentry are widely known or documented in the relevant arts.

Installing the Manifold

Figure 16:
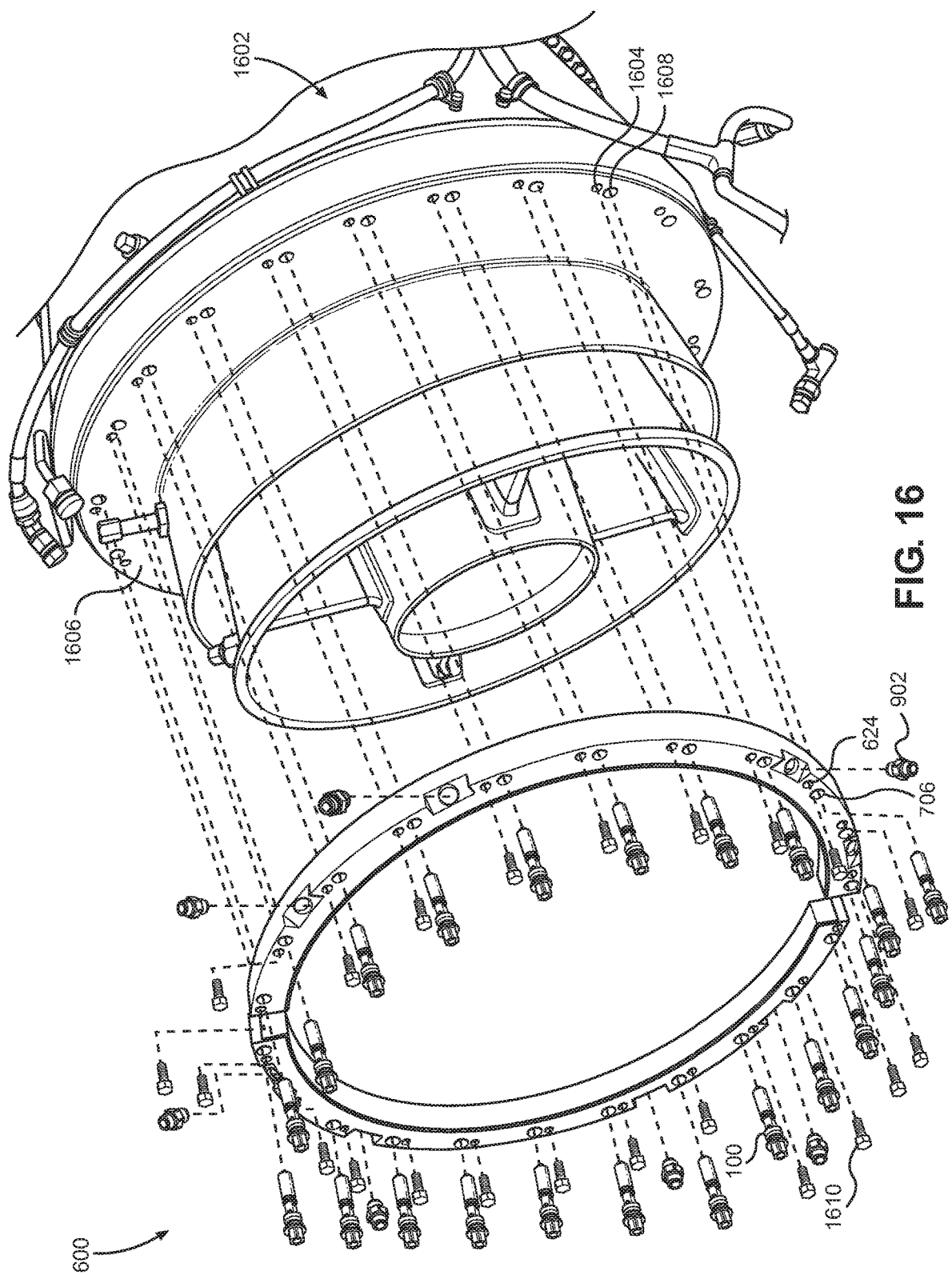
FIG. 16 is an exploded perspective view of a fuel manifold and attachments prior to installation upon a partially shown gas turbine engine.
Figure 19:
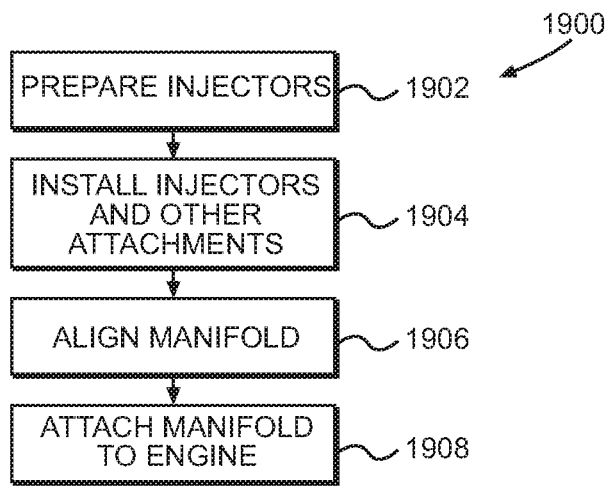
FIG. 19 is a flowchart showing operations to install a fuel manifold and fuel injectors to a gas turbine engine.

FIG. 19 depicts an exemplary method for installing a fuel manifold to a gas turbine engine. For ease of explanation, but without any intended limitation, the operations 1900 of FIG. 19 are described in the specific context of the FIGS. 16-17, with additional reference to FIGS. 1-15 described above.

In step 1902, the injectors 100 are prepared. The plugs 122, if not already installed, are inserted and then welded or otherwise adhered in place, sealing the engagement ends 104 of the fuel injectors 100. The o-rings 302/304 are placed into the corresponding recesses 118/120.

In step 1904, the fuel injectors 100 and other attachments are installed upon the fuel manifold 600. Namely, the injection end 106 of a fuel injector 100 is inserted through the top injector opening 706 of the manifold 600, continuing through the channel 704, and through the bottom injector opening 708. Thus, when installed, the injection end 106 and its injection ports 116 extend past the bottom surface 608 and protrude from the manifold 600. In the illustrated example, rotating the fuel injector 100 causes the threads 110 of the injector to engage with the corresponding threads 712 inside the channel 704. At this point, the flanges 124 engage with the sealing features 710 and the o-rings 302/304 form a seal against the surface of the channel 704.

Also in step 1904, fuel supply fittings 902 are inserted into the fuel supply openings 622 and threadably engaged to secure them in place. The fuel supply fittings 902 may be connected to fuel supply lines 1810 (discussed below) at this point, or before, or later after the 600 manifold is installed upon the engine 1602. Fasteners 1610 are inserted into the attachment openings 624, or this may be delayed until the manifold 600 is in-place upon the engine 1602.

In step 1906, the manifold 600 is aligned with the engine 1602. Ultimately, the manifold 600 is to be installed against a mounting surface 1606, which is an external surface of a combustion chamber (not shown) of a gas turbine engine 1602. Thus, alignment includes aligning the injectors 100 with fuel injector receivers 1608 defined in the mounting surface 1606, and also aligning the fasteners 1610, or at least the attachment openings 624, with attachment openings 1604 defined the mounting surface 1606. In one example, the attachment openings 1604 are threaded to engage with corresponding threads on the fasteners 1610.

In step 1908, the manifold 600 is moved toward the engine 1602 until the bottom surface 608 of the manifold 600 contacts the mounting surface 1606 of the engine 1602. The fasteners 1610 are threadably engaged with the threads (not shown) in the attachment openings 1608 to secure the manifold 600 in place.

Figure 17:
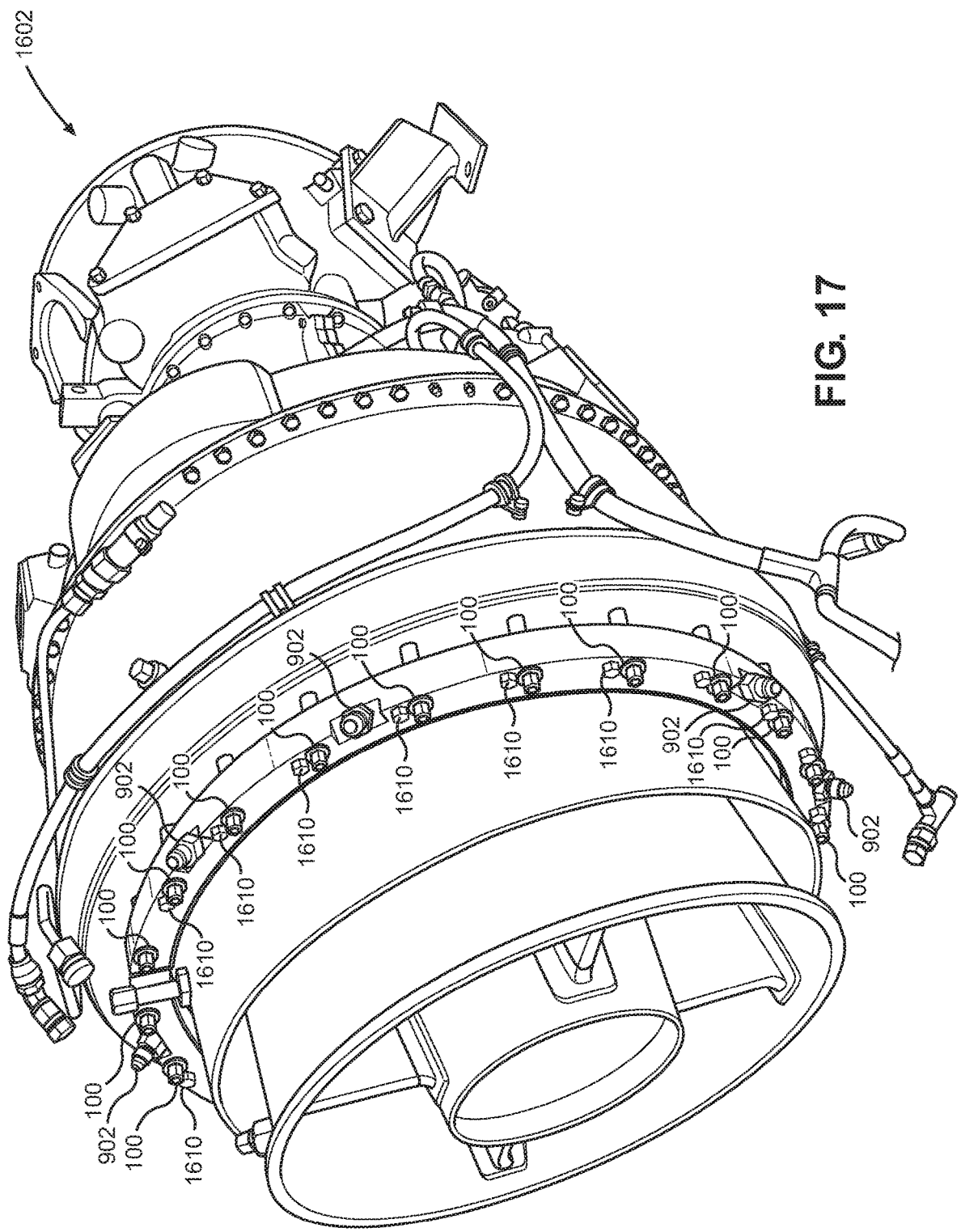
FIG. 17 is a perspective view of a gas turbine engine with fuel manifold and fuel injectors installed thereon.

FIG. 17 illustrates the fuel manifold 600 installed as described above.

Servicing a Single Fuel Injector

Figure 20:
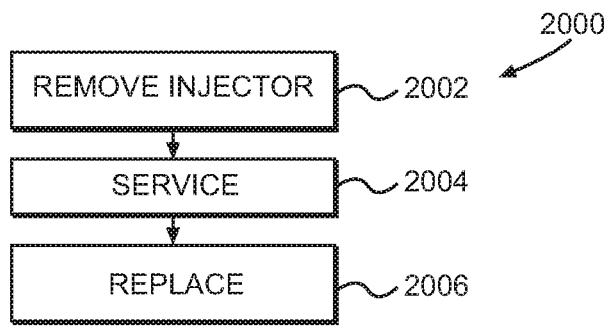
FIG. 20 is a flowchart showing operations to service a single fuel injector.

FIG. 20 depicts an exemplary method for servicing a single fuel injector from a fuel manifold that has been installed upon an engine. For ease of explanation, but without any intended limitation, the operations 2000 of FIG. 20 are described in the specific context of the FIGS. 16-17, with additional reference to FIGS. 1-15 described above.

Servicing of a fuel injector 100 may be performed on a routine basis according to normal maintenance, or according to a published life limit for such injectors, or in response to clogging or other malfunctions of a given fuel injector. In step 2002, a technician removes the subject injector 100. In the illustrated example, the technician engages a wrench or socket with the hex head or other engaging feature 108, and rotates the injector 100 to disengage the threads 110/712. With the threads 110/712 disengaged, the technician removes the injector 100 from the channel 704.

In step 2204, technicians service the fuel injector 100 that was removed from the manifold. Servicing may include replacing, rebuilding, or merely cleaning the injector. The o-rings 302/304 may optionally be replaced. And, if any one or more washers (not shown) are used between the flanges 124 and the seating features 712, then these washers may optionally be replaced.

In step 2006, technicians replace the removed fuel injector 100. This is performed in accordance with step 1904, described above.

Engine Operation

Figure 18:
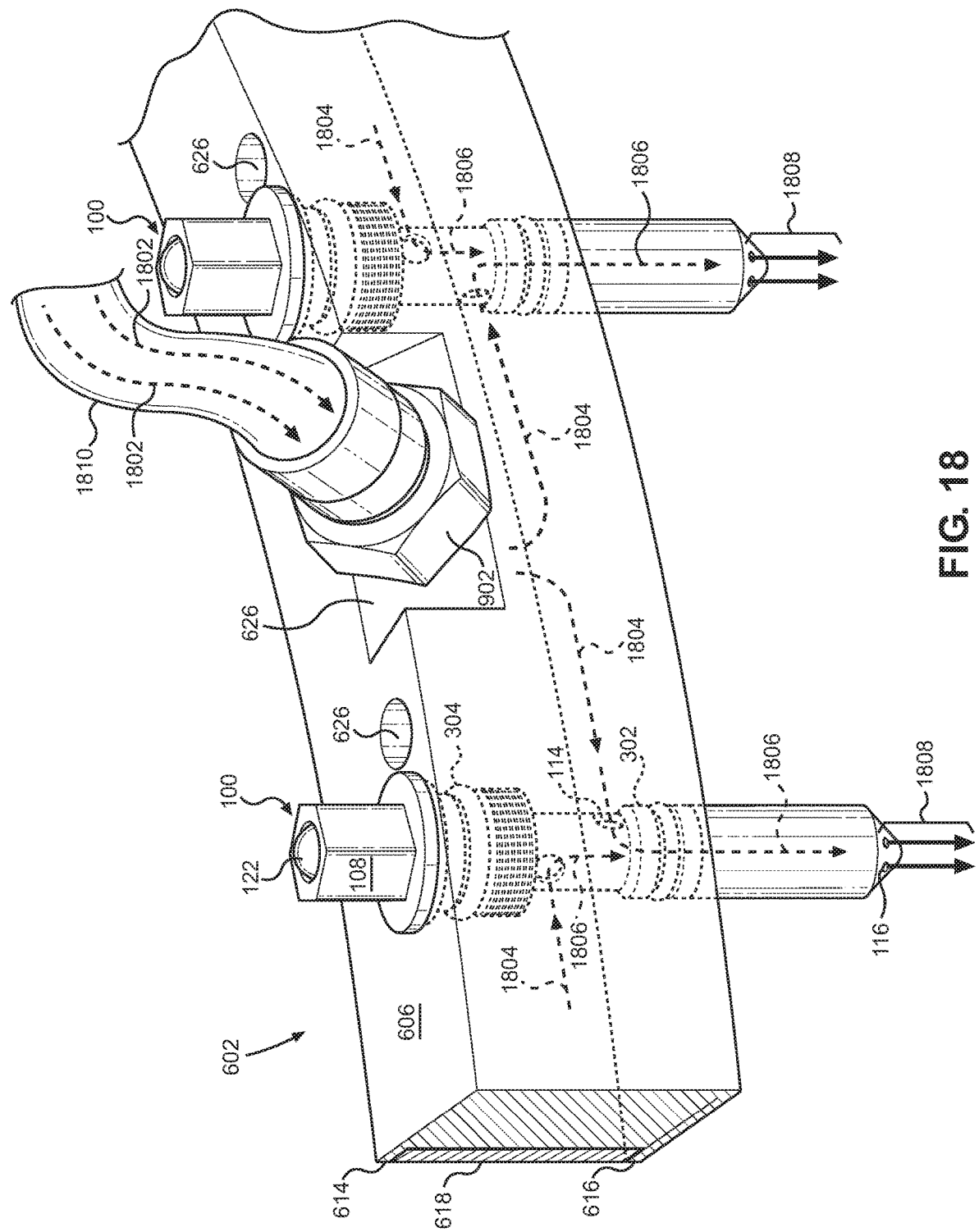
FIG. 18 is a partial cutaway perspective view of a section of fuel manifold and injectors depicting a fuel flow path.
Figure 21:
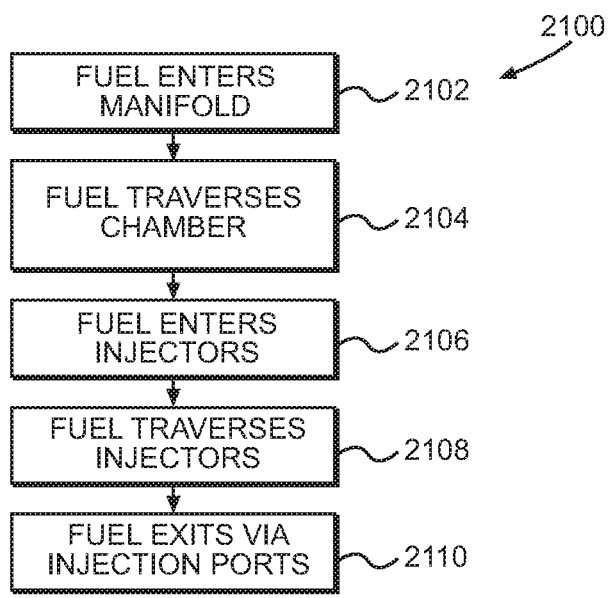
FIG. 21 is a flowchart showing operations describing behavior of fuel in the fuel manifold and injectors during engine operation.

FIG. 21 depicts the behavior of fuel in the fuel manifold 600 and injectors 100 during operation of the engine 1602. For ease of explanation, but without any intended limitation, the operations 2100 of FIG. 21 are described in the specific context of the FIG. 18, with additional reference to FIGS. 1-17 as appropriate. This step by step fuel path description is provided for ease of understanding. In practice, gaseous fuel or a fuel/air mixture is applied to the manifold 600 under high pressure and such vapor fills the various illustrated volumes rather than progressing as a stream. In one example, the volume and pressure of fuel introduced to the manifold 600 is dictated by digital engine control software, firmware, and/or hardware.

In step 2102, fuel enters the manifold 600. Namely, fuel enters the fuel supply fitting 902 as shown by 1802. This fuel comes from fuel supply lines such as 1810. In step 2104, fuel traverses the chamber 700 as indicated by 1804. Here, fuel passes from the fuel supply fittings 902 into the chamber 700 and fills the chamber 700 under high pressure.

In step 2106, fuel enters the injectors 100. Namely, fuel from the chamber 700 enters the injector's internal plenums 202 via the intake ports 114. In step 2108, fuel traverses the injectors. Namely, fuel proceeds from the intake ports 114 through the internal plenums 202 as indicated by 1806. In step 2110, fuel exits the fuel injector 100 via the injection ports 116 as indicated by 1808.

BENEFITS & ADVANTAGES

The disclosed fuel manifold and fuel injector provide a number of advantages. Chiefly, the servicing of a single fuel injector is drastically simpler and faster than in with prior approaches. In particular, with prior approaches, accessing a single injector required technicians to remove the entire manifold half containing that fuel injector. This because the fuel injector heads were screwed into the manifold from the engine side. Therefore, the fuel injectors could not be accessed externally.

In contrast, with the disclosed system, fuel injectors 100 can be removed individually while the manifold remains in place. This saves money because the engine 102 suffers less down time, increasing its utility and minimizing operating costs.

This saves further money and time for the following reason. With the prior approach, each fuel injector was installed with an expensive single-use crush washer, between the manifold and the engine. Removing the manifold required replacing all of the disposable crush washers. In an embodiment where the disclosed approach were to use such crush washers, it nonetheless eliminates the need to replace crush washers of non-serviced injectors when servicing a single fuel injector. Otherwise, the only time the crush washers would need to be replaced is if the manifold was removed or a washer leaked. Indeed, the inventive manifold can be serviced without being removed and in that case the washers would not need to be replaced.

Another advantage of the disclosed system is that it is considerably simpler than prior systems, and therefore more reliable and less expensive to manufacture. Prior systems used a two channel manifold with dual orifice fuel injectors. An electromechanical control system used one channel/orifice combination for engine starting and running, and the other channel/orifice combination for high speed engine operation. The inventors made an innovative recognition that, by discarding the electromechanical control system and using digital engine controls instead, the dual chamber/plenum could be discarded completely. Accordingly, the present system uses digital engine controls to differentiate fuel supply for starting, ongoing engine operations, and high speed operations, thereby for enabling the novel use of the disclosed single manifold chamber and single fuel injector plenum.

Another advantage of the disclosed system is that it reduces clogging or fouling of the injectors. In the original factory design, manifolds have two pairs of fuel inlets, with separate pairs of fuel inlets being located at the far ends of each manifold. In a typical installation, fuel to the factory manifold is fed into the bottom two inlets and the two openings on the opposite/top end are capped. This allows for the manifolds to be used on either side of the engine. In the case of the original manifolds, the fuel being feed at the lowest point on the manifold requires the manifold to be filled and the pressure being equal to ensure each injector receives the appropriate amount of fuel to run as designed. Injectors at the top of the manifold commonly clog or foul due to fuel starvation. In the disclosed example of the present system, there are four inlets (e.g., item 622 of FIG. 6) spaced around each manifold half and fuel is fed to all four ports. This arrangement distributes the fuel more evenly throughout the manifold resulting in less clogging or fouling of the injectors.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The invention claimed is:
1. A fuel distribution system for a gas turbine engine, the system including an annular fuel manifold including multiple walls defining a single hollow annular fuel chamber, the walls including upper and lower walls defining substantially parallel and substantially planar opposing injector-receiving and engine-receiving exterior surfaces, the walls also including circumferentially inner and outer side walls connecting the upper and lower walls and defining substantially cylindrical inner and outer side wall surfaces, and where a first one of the side walls has defined therein multiple substantially cylindrical injector receiving channels extending through the exterior surfaces and therebetween, where an opening of each said injector receiving channel in the injector-receiving exterior surface is substantially larger than an opening of said injector receiving channel in the engine-receiving exterior surface, and where each of the injector receiving channels is connected to the fuel chamber via one or more passages defined in the first side wall.

2. The system of claim 1, further comprising one or more removable fuel injectors.

3. The system of claim 2,
where each said fuel injector comprises with opposing engagement and injection ends, where a cross-section of the engagement end is larger than a cross-section of the injection end; and
where an opening of the injector receiving channel at the injector-receiving exterior surface is smaller than the cross-section of the engagement end.

4. The system of claim 2, where:
the fuel manifold is configured such that installation upon the engine requires an orientation wherein the engine-receiving exterior surface faces the engine;
the manifold and each of the one or more fuel injectors include securing features;
each of the injector receiving channels is sized and shaped to removably receive any one of the fuel injectors, and each said fuel injector includes an engagement end and an injection end; and
a size and shape of each said injector receiving channel relative to the one or more fuel injectors provides that when the manifold removably receives the injection end of one of the fuel injectors through the injector-receiving exterior surface into one of the injector receiving channels in the manifold, the securing features interoperatively fix the fuel injector in place with at least a portion of the engagement end of said fuel injector protruding from the injector-receiving tap exterior surface and the injection end of said fuel injector protruding from the engine-receiving exterior surface.

5. The system of claim 1, where the one or more passages are defined by a substantially continuous thinned annular band defined in an inner surface of the first side wall.

6. The system of claim 1, where the one or more passages are formed by multiple individual conduits defined in the first side wall and said passages place each of the injector receiving channels in fluid communication with the fuel chamber.

7. The system of claim 1, where the manifold includes multiple fuel supply line openings configured to receive fuel supply line fittings, where each of the fuel supply line openings is in fluid communication with the fuel chamber.

8. The system of claim 1, where the manifold comprises one or multiple sections together forming a substantially circular shape.

9. The fuel manifold of claim 1, further comprising one or more removable fuel injectors, where each said fuel injector comprises an elongated body with opposing engagement and injection ends, and where each of said fuel injectors and the manifold are sized such that upon fully and removably inserting one of the fuel injectors into one of the injection-receiving channels: at least a portion of the injection end of the fuel injector protrudes from the engine-receiving exterior surface, at least a portion of an engagement end of the fuel injector protrudes from the injector-receiving exterior surface.

10. The system of claim 1, where each of the injector receiving channels is located internal to and substantially surrounded by solid structure of the first side wall.

11. A fuel distribution system for a gas turbine powerplant, the system comprising:
an annular fuel manifold including multiple walls defining a single hollow annular fuel chamber, the walls including upper and lower walls defining substantially parallel and substantially planar opposing top and bottom exterior surfaces, the walls also including circumferentially inner and outer side walls connecting the upper and lower walls, and where a first one of the side walls has defined therein multiple substantially cylindrical injector receiving channels extending through the top and bottom exterior surfaces and therebetween;
one or more substantially cylindrical fuel injectors, where each said fuel injector includes opposing ends including an engagement end and an injection end, the fuel injector having defined therein a single internal plenum sealed by structure of the fuel injector at the engagement end and having external openings limited to (1) one or more intake ports defined in a midsection of the fuel injector and (2) one or more injection ports defined in the injection end.

12. The system of claim 11, where the fuel manifold is configured such that installation upon the engine requires an orientation wherein the bottom exterior surface faces the engine, and where a size and shape of each said fuel injector relative to the manifold provides that when said fuel injector is inserted through the top exterior surface into one of the injector receiving channels in the manifold, and securing features of the manifold and the fuel injector interoperatively fix the fuel injector in place, at least a portion of the engagement end protrudes from the top exterior surface while the injection ports protrude from the bottom exterior surface and the one or more intake ports are in fluid communication with the fuel chamber.

13. The system of claim 11, where each said fuel injector includes a first securing feature, and each of said injector receiving channels includes a second securing feature shaped and sized to interoperate with the first securing feature to fix the fuel injector in place within the injector receiving channel.

14. The system of claim 11, where:
the fuel injector further includes a first securing feature;
each of said injector receiving channels includes a second securing feature shaped and sized to interoperate with the first securing feature to fix the fuel injector in place.

15. The system of claim 14, where the first and second securing features comprise mating threads.

16. The system of claim 11, where each said fuel injector includes an annular flange protruding from the fuel injector proximate the engagement end and positioned such that when the fuel injector is inserted into one of the injector receiving channels and fixed in place the flange abuts a seating feature of the manifold located at or near the top exterior surface of the manifold.

17. The system of claim 11, where the first side wall has defined therein one or more conduits or cut-outs placing each of the injection receiving channels in fluid communication with the fuel chamber.

18. A method for configuring a fuel distribution system for a gas turbine engine, comprising operations of:

providing an annular fuel manifold including multiple walls defining a single hollow annular fuel chamber, the walls including upper and lower walls defining substantially parallel and substantially planar opposing top and bottom exterior surfaces, the walls also including circumferentially inner and outer side walls connecting the upper and lower walls, and where a first one of the side walls has defined therein multiple substantially cylindrical injector receiving channels extending through the top and bottom exterior surfaces and therebetween;

providing one or more substantially cylindrical fuel injectors, where each said fuel injector includes opposing ends including an engagement end and an injection end, each said fuel injector having defined therein a single internal plenum sealed by structure of the fuel injector at the engagement end and having external openings limited to (1) at least one intake port defined in a midsection of the fuel injector and (2) at least one injection port defined in the injection end; and removably receiving one of the fuel injectors, injection end first, into each of one or more of the injector receiving channels.

19. The method of claim 18, where the receiving operation is performed while the fuel manifold is mounted to the gas turbine engine with the bottom exterior surface abutting the engine.

20. The method of claim 18, further comprising operations of:

while the fuel manifold remains continuously mounted to the gas turbine engine such that the bottom exterior surface abuts the engine, removing one or more of the fuel injectors from the fuel manifold.

21. A fuel distribution system for a gas turbine engine, the system including an annular fuel manifold, wherein:

the manifold includes multiple walls including upper and lower walls, where the lower wall defines an engine facing exterior surface and the upper wall defines an injector receiving exterior surface, and the exterior surfaces are substantially parallel and substantially planar;

the multiple walls further include circumferentially inner and outer cylindrical side walls connecting the upper and lower walls;

the walls define therebetween a single hollow substantially annular fuel chamber;

a first one of the side walls includes a thickness defining therein multiple substantially cylindrical injector receiving channels extending through the exterior surfaces and therebetween, the injector receiving channels being substantially orthogonal to the exterior surfaces;

each said injector receiving channel includes a first opening where the injector receiving channel passes through the injector receiving exterior surface and a second opening where the injector receiving channel passes through the engine facing exterior surface;

said first opening is substantially larger than the second opening; and each of the injector receiving channels is connected to the fuel chamber via one or more passages defined in the first side wall.

22. The system of claim 21, further Comprising the gas turbine engine, where the fuel manifold is mounted to the gas turbine engine with the engine facing exterior surface abutting a combustor section of the gas turbine engine.

23. The system of claim 22, further comprising a substantially cylindrical fuel injector having opposing distal and proximal ends, the distal end having defined therein multiple injector ports and the proximal end comprising an engagement end closed by leakproof structure of the fuel injector, where the engagement end includes structure sufficiently larger than the second opening requiring insertion of the fuel injector into the first opening of the manifold to occur distal end first.

* * * * *